(12) United States Patent
Prasad et al.

(10) Patent No.: US 12,190,619 B2
(45) Date of Patent: Jan. 7, 2025

(54) SYSTEM FOR TRANSPORTATION AND SHIPPING RELATED DATA EXTRACTION

(71) Applicant: KoiReader Technologies, Inc., Dallas, TX (US)

(72) Inventors: Ashutosh Prasad, Dallas, TX (US); Vivek Prasad, Bengaluru (IN)

(73) Assignee: KoiReader Technologies, Inc., Dallas, TX (US)

( * ) Notice: Subject to any disclaimer, the term of this patent is extended or adjusted under 35 U.S.C. 154(b) by 0 days.

(21) Appl. No.: 18/636,719

(22) Filed: Apr. 16, 2024

(65) Prior Publication Data

US 2024/0296689 A1    Sep. 5, 2024

Related U.S. Application Data

(63) Continuation of application No. PCT/US2022/079015, filed on Nov. 1, 2022.

(60) Provisional application No. 63/263,417, filed on Nov. 2, 2021.

(51) Int. Cl.
| | | |
|---|---|---|
| G06V 30/41 | (2022.01) | |
| G06V 30/14 | (2022.01) | |
| G06V 30/146 | (2022.01) | |
| G06V 30/18 | (2022.01) | |
| G06V 30/19 | (2022.01) | |
| G06V 30/26 | (2022.01) | |
| G06V 30/413 | (2022.01) | |

(52) U.S. Cl.
CPC .... *G06V 30/19173* (2022.01); *G06V 30/1448* (2022.01); *G06V 30/1463* (2022.01); *G06V 30/1801* (2022.01); *G06V 30/26* (2022.01); *G06V 30/413* (2022.01)

(58) Field of Classification Search
CPC .................................................. G06V 30/00–43
See application file for complete search history.

(56) References Cited

U.S. PATENT DOCUMENTS

| | | | | |
|---|---|---|---|---|
| 6,125,362 | A * | 9/2000 | Elworthy | G06F 40/263 |
| 8,787,681 | B1 * | 7/2014 | Rubio | G06V 30/40 |
| | | | | 382/229 |
| 9,298,997 | B1 * | 3/2016 | Lecky | G06V 30/424 |
| 9,946,924 | B2 * | 4/2018 | Sengupta | G06F 16/345 |
| 2008/0137954 | A1 * | 6/2008 | Tang | G06V 30/413 |
| | | | | 382/176 |
| 2011/0096983 | A1 * | 4/2011 | Jensen | G06V 30/268 |
| | | | | 382/187 |
| 2015/0066895 | A1 * | 3/2015 | Komissarchik | G06V 30/413 |
| | | | | 707/709 |

(Continued)

OTHER PUBLICATIONS

The PCT Search Report and Written Opinion mailed Feb. 7, 2023 for PCT application No. PCT/US22/79015, 19 pages.

*Primary Examiner* — Sean T Motsinger
(74) *Attorney, Agent, or Firm* — Lee & Hayes, P.C.

(57) ABSTRACT

A system is discussed herein that is configured for extracting data from documents. In particular, the system may be utilized for automating and computerized checking of transit and shipping related documents. For example, the documents may include various data, such delivery dates, prices, inventory identification, personnel identification, container identification, customs documents, transport documents, a combination thereof, and the like.

20 Claims, 17 Drawing Sheets

(56) References Cited

U.S. PATENT DOCUMENTS

| | | | |
|---|---|---|---|
| 2015/0269433 A1* | 9/2015 | Amtrup | H04N 1/00106 |
| | | | 382/115 |
| 2017/0109818 A1* | 4/2017 | Amtrup | G06V 30/412 |
| 2017/0351914 A1* | 12/2017 | Zavalishin | G06V 10/50 |
| 2017/0351915 A1* | 12/2017 | Thompson | G06V 30/413 |
| 2018/0232884 A1* | 8/2018 | Hayashi | G06V 10/44 |
| 2018/0268015 A1 | 9/2018 | Sugaberry | |
| 2018/0285835 A1* | 10/2018 | O'Neill | G06Q 20/18 |
| 2019/0372968 A1* | 12/2019 | Balogh | G06N 20/00 |
| 2020/0143160 A1* | 5/2020 | Liu | G06F 18/2431 |
| 2020/0302165 A1* | 9/2020 | Dang | G06N 20/00 |
| 2020/0392571 A1 | 12/2020 | Koehler et al. | |
| 2021/0081664 A1* | 3/2021 | Weller | G06F 40/226 |
| 2021/0124919 A1* | 4/2021 | Balakrishnan | B42D 25/309 |
| 2021/0182548 A1* | 6/2021 | Ayyadevara | G06V 30/18057 |
| 2022/0051043 A1* | 2/2022 | Lee | G06N 3/08 |
| 2022/0067828 A1* | 3/2022 | Gross | G06V 10/7784 |
| 2022/0156488 A1* | 5/2022 | Mokhtari | G06F 40/284 |
| 2022/0292802 A1* | 9/2022 | Simpson | G06V 30/40 |
| 2022/0351088 A1* | 11/2022 | Kumar | G06N 7/01 |
| 2023/0046344 A1* | 2/2023 | Grohs | G06F 40/216 |
| 2023/0205800 A1* | 6/2023 | Avivi | G06F 40/30 |
| | | | 382/176 |
| 2024/0217257 A1* | 7/2024 | Wells | G06V 20/95 |

* cited by examiner

SYSTEM FOR TRANSPORTATION AND SHIPPING RELATED DATA EXTRACTION

CROSS-REFERENCE TO RELATED APPLICATION

This application claims priority to and is a continuation of International Application No. PCT/US22/79015 filed on Nov. 1, 2022 and entitled "SYSTEM FOR TRANSPORTATION AND SHIPPING RELATED DATA EXTRACTION," which claims priority to U.S. Provisional Application No. 63/263,417, filed on Nov. 2, 2021 and entitled "SYSTEM FOR TRANSPORTATION AND SHIPPING RELATED DATA EXTRACTION," the entire contents of which are incorporated herein by reference.

BACKGROUND

Shipping, trucking, and other delivery networks have been growing at an ever increasing pace, as more and more goods are moved around the world. Unfortunately, each jurisdiction, company, licensing entity, and/or delivery method has its own forms, documents, and labels. Additionally, the quality, completion, care and other maintenance of paper documents is often lacking. This wide variety, varying types of forms, number of documents, and poor maintenance and completion metrics together with the ever increasing number of containers, shipping vehicles, and amount of cargo have created large logistical delays at storage facilities, shipping yards, processing plants, warehouses, distribution centers, ports, and the like as the associated documents are manually checked and recorded at each location.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
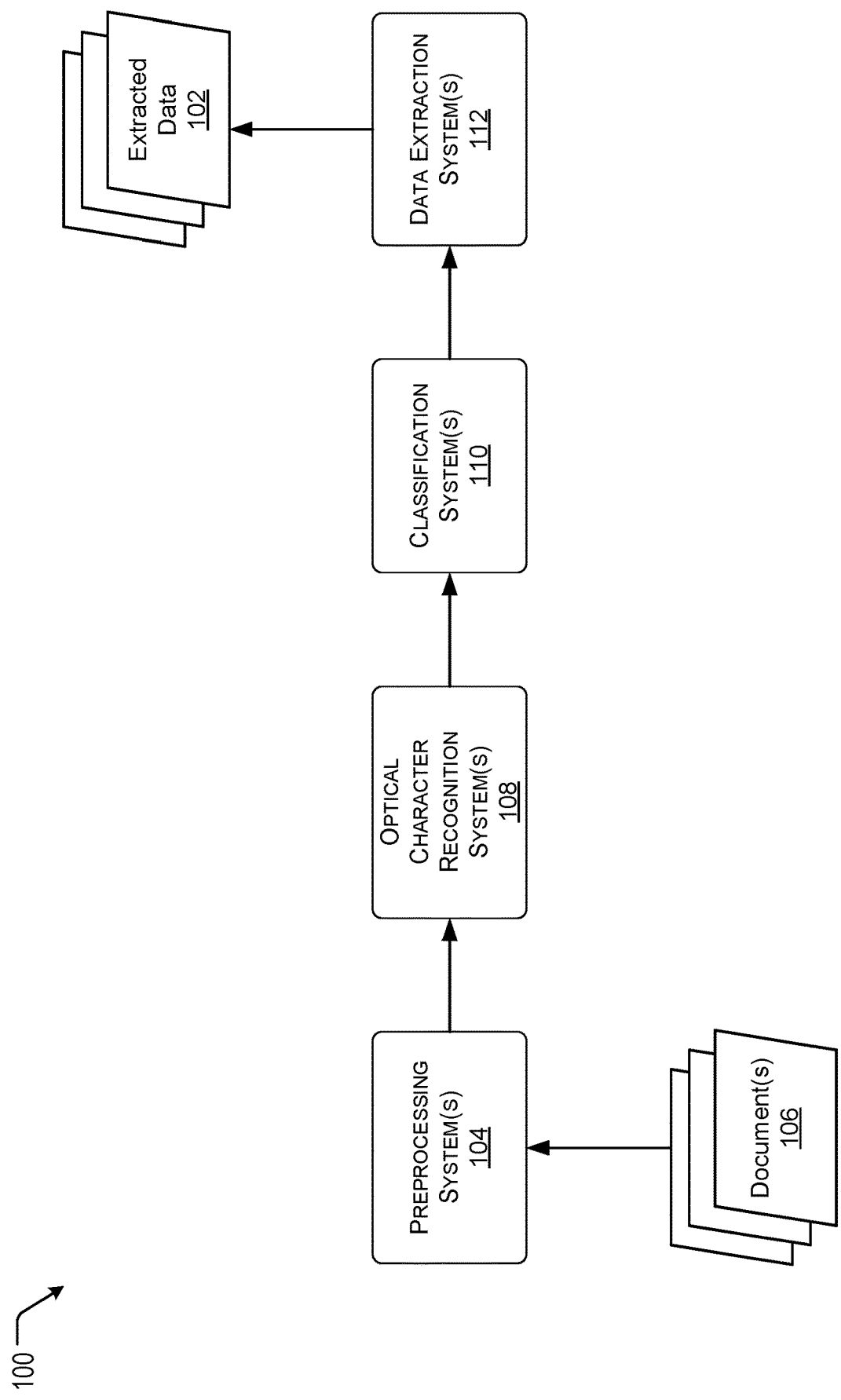
FIG. 1 is an example block diagram of an architecture for extracting data from transport related documents according to some implementations.

Discussed herein is a system for extracting data from documents. In particular, the system may be utilized for automating and computerized checking of transit and/or shipping related documents, such as check in and check out processes at entry and exit locations of facilities associated with the logistics and transportation industries. For example, the documents may include various data, such delivery dates, prices, inventory identification (identifiers, quantities, owners, buyers, sellers, and the like), personnel identification (e.g., drivers or other handlers), container identification, customs documents, transport documents, and the like.

The documents may be structured documents, semi-structured documents, and/or unstructured documents. The structured documents may include legible content in specified or known formats and data arrangements and includes proper grammar and sentence structure. The semi-structured documents may include content such as, tables, charts, key value pairs, and other expected data entries. However, in the semi-structured documents the data entries (e.g., table entries, key value entries, and the like) may be handwritten, in multiple languages, and/or contain unexpected key values. The unstructured documents may contain desired content but be handwritten, free form, unformatted, in multiple languages, and the like.

In some examples, pages of the documents may be scanned, copied, or otherwise converted to images or other electronic forms, at various entry and exit locations of facilities associated with the transport industry. Data may then be extracted from the images using a plurality of techniques discussed herein.

For example, the system may be configured to receive the images of the pages (such as via email, scanned document, as part of an image capture, or the like). The system may first perform preprocessing on the images of the pages. For example, the system may remove imperfections (such as food or drink stains, smudges, fingerprints, dirt or water damage, watermarks, ink blocks, and the like) from the images. For example, the system may utilize a machine learned model to segment the images, classify the imperfections and/or the content of the pages, and/or generate bounding boxes associated with the segmented and classified imperfections. The system may then modify brightness, contrast, saturation, and the like with respect to the content (e.g., to darken the content) and the imperfections (e.g., to lighten the imperfections) to improve the output of future optical character recognition techniques.

The system may also determine an upright or vertical position of individual pages or images and, using the detected angle or orientation, rotate the images to align each of the pages/images to the upright or vertical position. For example, the system may detect the bottom and/or top of a page/image based on a content (such as a header, title, footer, page number, and the like). In addition to, or in lieu of the content, the system may also determine the upright or vertical position using an analysis of the content (e.g., words and characters), in some cases, with respect to an edge of the image. For instance, many characters have a vertical or upright component that typically aligns with an upright position of the page (particularly, with respect to machine generated text). Thus, the system may utilize various heuristic or rule based techniques and/or machine learned models/networks to detect the machine generated content or text and determine a upright vector associated with particular portions of the text. In other cases, the system may detect lines (either implicated, such as the edge of a paragraph, or physical, such as the edge of a table) and utilize a vector associated with the line as the upright position.

In some cases, the system may utilize multiple techniques discussed above to generate an upright position and/or angle of the page. The system may assign a confidence value or score to each of the techniques and then align the page/image with the upright position based on the output of the multiple techniques and the confidence values associated with each. For example, often when capturing image data and/or scanning multiple pages of a document or documents, it is difficult to align each page to the same upright or vertical position (e.g., one or more of the pages is imaged at an angle with respect to the others), particularly, if one page is 180 degrees opposite the others. Thus, by utilizing multiple techniques, the upright position may be disambiguated from other possible alignments generated by an individual technique.

The preprocessing performed by the system may also be configured to order or arrange the pages/images in a desired manner. For example, the documents may be out of order or become intermingled with other documents (e.g., a page of a first document is scanned or imaged between pages of a second document). In these examples, the preprocessing may identify or classify each image/page as belonging to a particular document and/or of a particular type. The system may then sort the images/pages based on the class and/or type. In some cases, the system may also identify page numbers or matching content and order the images/pages based on the identified page numbers and/or matching content, such that each page is associated with a corresponding document and the pages of each document are in order. In some cases, the system may utilize one or more machine models or network to order and sort the images/pages of the documents. The system may utilize confidence values associated multiple techniques to classify, sort, and/or order the pages. Then the system may generate the output arrangement based at least in part on the confidence values of the multiple techniques.

In some cases, the preprocessing may also determine overrides or governing documents. For example, the images/pages may be received as an attachment to an email. In some cases, the body of the email may include content that overrides or modifies the attachment (such as an updated delivery date, updated inventory count, or the like). In some examples, the system may parse the email content to detect any overrides or changes included.

Once the preprocessing is complete, the system may perform optical character recognition on individual images of the pages of the document(s). During optical character recognition, the system may detect text. For instance, the system may utilize multiple techniques for text detection. In one example, the system may detect the text based content of the image/page and generate bounding boxes around the text in order to generate defined regions or text boxes. The system, may also at this time, detect and assign a language associated with the document. The system may also determine if the content is in multiple languages, as is often common in international trade and customs documents. The system may then select and apply one or more optical character recognition techniques based on the quality of the defined region or text boxes and the language(s) assigned. For instance, one or more of the optical character recognition techniques may include applying a machine learned model/network and/or a dictionary based technique in which the model, network, and/or dictionary are selected based on the one or more languages assigned.

As an example of an optical character recognition technique, the system may perform a first text recognition technique on character by character basis and a second text recognition technique on word by word basis. In this example, the system may generate a vector for individual characters in the first technique and individual words in the second technique. The results of the first technique and the second technique may then be merged to generate the machine readable text or content. By utilizing the word based or second technique, words may be more quickly and efficiently defined, and the corresponding machine readable text generated. Additionally, using the word based technique spelling errors may be detected and spelling corrections may be applied, and word dictionaries in the selected language may be applied to improve the output of the machine readable text.

However, simply using the word based technique may result in misclassification for single character words and/or similar words and numbers (such as the number "1" and the word "I" in English). In particular, many transit, shipping, and customs forms include alpha-numerical serial numbers that are unique, not present in a dictionary, and may include numbers as well as letters in the same string of characters. Accordingly, by using the character based technique, the system may more reliably identify individual characters of a string and thereby provide more accurate data extraction.

Once the machine readable content has been generated, the system may determine duplicative content and/or aliases for the content. For example, many international documents may have the same content in multiple languages, such as the origin language and the destination language. In these cases, the system may be able to both confirm the content as accurate across both languages and then remove the content in one or more of the languages to reduce processing and improve accuracy associated with the data extraction. For instance, the system may convert the machine readable content to a consistent language (such as a predominate language within the content) and compare the content of the various languages to determine one or more matches. If a match is detected, the content can be confirmed as accurate and the copies, filter or otherwise, removed from the document to, as discussed above, improve processing.

The system may also assign aliases using one or more aliases dictionaries. For example, in some documents the term "ship to" may be used as a standard designation for the term "destination". In this example, the system may identify the corresponding terms within the dictionary and assign each the same key value descriptors in preparation for data extraction.

The system may also perform classification on the content to determine document formats or types and the like prior to data extraction. The system may, during data extraction, be configured to extract specific key value entries based on the assigned class (e.g., the key value descriptors may be selected based on the assigned class). For example, the system may classify a document as a bill of lading. In this example, the system may extract specific key value entries to match key value descriptors such as inventory identifiers, inventory type, inventory quantity, and the like typically associated with the bill of lading.

In some cases, the system may utilize multiple techniques to segment and/or classify the documents or individual pages of the documents. In one example, the system may apply a text or content based technique using a text based classification model that applies a set of heuristic based rules. For example, the text or content based technique may utilize a named-entity recognition (NER) technique and/or part of speech (POS) tagging to classify the documents and/or pages. For instance, the text or content based technique may determine a class based on the content of the individual documents and/or pages and a set of predetermined rules or dictionaries. In this example, the system may also determine a confidence value associated with each individual classification generated by the text or content based technique or process.

The system may also apply a layout analysis technique to segment and classify the documents and/or pages. For example, the system may determine font height, document colors (e.g., font colors, background colors, table colors, and the like), font weight, spacing, positions of detected key value descriptors, and the like using one or more dictionaries, or machine learned and/or heuristic based models. As discussed above, the system may also generate a confidence value associated with each individual classification generated by the layout analysis technique or process.

The system may also apply a second machine learned model or deep learning technique to segment and classify the documents and/or pages. For example, the system may include a machine learned model, networks, and/or heads trained using customs, transport, shipping, and other related documents in order to segment and/or classify the documents and/or pages of the documents. For example, the first text based technique may utilize a bidirectional encoder representation form transforms (BERT) model and/or a long short-term memory (LSTM) network to classify the documents and/or pages. Once again, the system may also generate a confidence value associated with each individual classification generated by the machine learned model and/or deep learning technique or process.

The system may then select a classification based at least in part on the classification from each of the multiple techniques and the corresponding confidence values. For example, if greater than a first threshold (e.g., 51%, 75%, and the like) number of techniques generates the same classification, the classification may be applied. If no classification equals or has greater than the first threshold number of techniques, the system may remove techniques having a confidence value less than a second threshold (e.g., 10%, 25%, 50%, 75%, and the like) and select from the remaining techniques. Alternatively, the system may select the classification having the highest corresponding confidence value.

In one example implementation, the system may utilize two techniques to determine the class and then apply a third technique when the first two techniques generated either different classes and/or the same class with low corresponding confidence values. In this manner, the third technique may only be utilized in a low number of instances, thereby improving the overall processing speed and reducing the overall resource consumption of the system.

Once the documents and/or pages are classified and segmented and the machine readable content is generated, the system may perform data extraction on the documents. In some cases, the system may extract data based on key value pairs (e.g., a key value descriptor and an associated or corresponding key value entry). For example, the system may include subsystems for processing the content of the documents to extract addresses, contact details, optical marks, barcodes/QR codes, tables, and the like.

In some implementations, to extract the addresses, the system may utilize the output of the layout analysis and/or other predetermined pattern associated with a document to determine a location of an address. The system may again utilize multiple techniques to identify the location of an address. For instance, the system may identify instances of key value descriptors, such as "ship to", "delivery location", "origin", and the like that may indicate an address in proximity. In some cases, the key value descriptors may be associated or stored in an address dictionary. In other instances, the system may utilize one or more image recognition techniques and/or machine learned models to identify a pattern of an address content of the document. The system may parse the machine readable content to identify words common to an address (e.g., city, state, road designations, such as road, street, court, and the like, etc.).

Once an address is located, the system may determine a bounding box and/or string associated with the address, for instance, by searching the content to the right and left of the location. The content of the bounding box may be extracted as individual components of an address, such as country, state, city, street name, street number, zip code, and the like. In some cases, the system may extract and/or differentiate between the components by utilizing NER techniques and predictive matching techniques with one or more location dictionary. In some cases, the language for the document may indicate the location dictionary that is being used. As one illustrative example, the system may identify an address and extract a city or zip code using a dictionary. The system may then utilize a dictionary associated with the city or zip code to identify the street name and/or address. For instance, the street name may be misspelled but by using a local dictionary a nearest match may be found and the street name may be identified and extracted.

After the address components are extracted, the system may remove the address data and any corresponding key pair descriptors from the content and then parse the content of the document for another address. In this example, the addresses are extracted and removed from the content, then another address is identified. But it should be understood that the system may operate the data extraction techniques and systems, discussed herein, in parallel and remove various portions of the content also in parallel such that the amount of content being parsed may be reduced as data that is less easily identified and extracted is targeted.

The system may also extract data related to contact details, such as companies, individuals, phone numbers, emails, fax numbers, and the like. In some cases, the system may utilize a NER techniques as well as one or more name, entity, phone number dictionary or the like. In some cases, the dictionary may be selected based on the address of origin and/or destination. The dictionaries may also include lists of all known companies operating within a given jurisdiction and the like.

The system may also include a list of key value descriptors that may be used to match or identify key value entries as discussed herein. For instance, the country code or phone number pattern may be used to assist with parsing, identifying, and extracting the phone numbers. The system may also utilize POS techniques, machine learned models and/or networks, one or more heuristic based technique, and the like. The system may again assign confidence values associated with the extracted contact details and utilize the confidence values to select between differing outputs of individual techniques, as discussed herein.

The system may also extract data associated with dates. As one illustrative example, the date may be extracted by searching for and matching patterns known to represent a date. In some cases, the patterns may be selected based on the location of origin and/or destination. In some implementations, the system may compare extracted dates with each other in order to match and determine the pattern being used within the document. For instance, a month may be both written in words as well as placed prior to a day or after a day in a numerical representation. The system may utilize the written month to determine if the document is using a day-month-year format or a month-day-year format.

The system may also extract optical mark recognition. For example, the documents may include selectable or checkable sections that provide specific fields of data to the reader. The system may extract the selected optical marks using pattern matching (e.g., identifying the checkboxes, radio buttons, yes/no buttons, and the like). The system may determine the content corresponding to the optical marks by using measurement variables or boxes about the optical mark. For instance, the determining of a uniform border or distance to text based content between multiple optical marks and/or distance between optical marks themselves and identifying substantially similar, corresponding, or the same distances between text based content adjacent to the optical marks. The system may also utilize geometric pattern matching, and text based analysis to determine the content associated with the selected optical marks. Once identified, the content associated with the selected and/or unselected optical marks may be extracted and then removed or otherwise filtered from the document.

The system may also perform data extraction techniques associated with barcodes, QR codes, stickers, other machine readable icons or representations, and the like. In some cases, the system may utilize pattern matching, machine learned models/networks, image processing techniques, and the like to identify the presence of a machine readable icon. The system may read the data from the machine readable icon and determine if it is duplicative or new. If the data is duplicative the system may use the data to validate the extracted data and if the data is new, the system may assign the extracted data as a key value entry of the corresponding key value pair.

The system may also extract table data in order to generate or provide virtual tables associated with the content. In these examples, the system may utilize different approaches for different types of tables. For instance, they system may use a first set of multiple techniques for bordered tables and a second set of multiple techniques for borderless tables.

In the case of bordered tables, the system may utilize techniques that perform pattern matching (such as via one or more machine learned models) to determine a location of a table. For example, the system may detect borders of a table then determine the content at the location is a table by analyzing header section, footer section, spacing between rows and columns, other geometric patterns, and the like. In some cases, as a second technique or if a confidence of the table/row/column/entry detecting has low confidence, the system may remove the borders from the content (e.g., using a computer vision technique) and process the bordered table using the borderless table techniques, discussed below.

The system identifies borderless tables by utilizing a pattern matching associated with geometric patterns and/or changes in geometric patterns from prior or other content of the document and/or page. As an illustrative example, the system may determine the average word spacing, line spacing, and the like on a per document or per page basis. The system may then compare the word spacing and line spacing for the content associated with the table. In this example, if the word spacing and/or line spacing differ from the average, then the system may identify the area with the differing spacing or other geometric patterns as a table.

As a non-exhaustive list of other types of techniques of identifying a boarded and/or borderless table may include, but is not limited to, textual patterns, semantic similarity of proximate content (e.g., content above and next to), industry based dictionaries, machine learned models and/or networks, keyword or key value pair detection, utilizing vectorization word features (e.g., font size, font weight, font type, word meaning, and the like), NER techniques, domain intelligence, coreference resolution techniques, computer vision techniques, text type analysis (e.g., numerical, alphabetic, serial number, currency, measurement, and the like), heuristic based models, and the like.

In some cases, the system may again assign confidence values to the location and/or content identified as pertaining to a table. The system may then determine the entries, borders or bounding box of the table content using the confidence values. Likewise, the system may utilize confidence values in using multiple techniques to identify the location, bounding box, and/or content of each individual entry of the table.

Once the table is located and the content identified, the system may determine the content of the table. For example, the system may utilize the content in the header sections, various column and row header entries, and geometric patterns of the body content of the table and the like to determine a subject matter or type of the table. The system may also determine if entry columns are in alphabetic characters and/or numerals. If the column is numerals the system may determine a standard (e.g., dollars, euros, pounds, ounces, meters, number of units, and the like) being used and utilize the standard to assist in classing the table type or subject. In some cases, by utilizing combinations of column standards and/or one or more machine learned models, the system may classify the type or subject matter of the table. Again, once the table is identified, the type or subject matter determined, the system may parse and extract the content to generate a virtual table.

In some cases, such as in borderless tables, the system may have to determine where a column/row entry ends and starts. In these cases, the system may again utilize the geometric patterns. But in some cases, the entries may be handwritten or otherwise extend into a second column or row. In these cases, the system may parse the content to determine semantically related content and organize the semantically related content as associated with a particular table location or entry. Again, as each entry/table is extracted, the system may remove the content from the document and re-process the table/page/document to reduce the content remaining at each pass and thereby reduce the complexity at each pass.

The system may also extract data associated with values (payment amounts, price per units, and the like), inventory identifiers, and the like. In some cases, the additional data extracted may be based on the classification of the document and/or page as well as based on the aliases detected and assigned. As one illustrative example, the date may be extracted by searching for and matching patterns known to represent a date. In some cases, the patterns may be selected based on the location of origin and/or destination. In some implementations, the system may compare extracted dates with each other in order to match and determine the pattern being used within the document. For instance, a month may be both written in words as well as placed prior to a day or after a day in a numerical representation. The system may utilize the written month to determine if the document is using a day-month-year format or a month-day-year format.

In some cases, the system may also perform key value conflict resolution, such as when multiple key value entries correspond to the same key value descriptor. In some cases, the system may, for instance, convert values in different currencies or denominations to the same standard and compare the values. The system may also sum columns and rows and/or apply checksums to various values to identify if one or more of the values are inaccurate or includes errors.

The system may also perform data enrichment on the extracted data. For example, if one or more fields are missing, the system may determine value of the missing key entry using the extracted data. For example, if a city and street name are extracted but a state is not extracted, the system may utilize one or more databases to determine the state associated with the city and street. As another example, the system may utilize extracted SWIFT codes to access and populate missing banking details. In this manner, the system may utilize public and private third-party databases to complete missing information and/or confirm key value entries are accurate and complete. In other cases, the system may confirm dates such as by using contract terms. For instance, validating the date extracted matches a 30 day delivery timeline from the date of an original contract or invoice.

The extracted data may then be used to verify entry (e.g., the driver and vehicle is authorized and/or expected), complete required forms (e.g., government forms, custody forms, liability forms, and the like), and notify various entities that delivery tasks are completed, delayed, and/or on schedule. For example, at a port, the captured information may be utilized to identify an incoming shipment of containers, complete initial customs forms, and transfer custody or delivery of container and any goods associated therewith.

In the manner discussed herein, the system may reduce the amount of time associated with checking in and/or out each transport, container, and the like as delivers are made and received. For example, conventional manual check out processes at a logistics facility typically take between 30 and 45 minutes per vehicle and, in some case, may take as long several hours per vehicle. In some instances, such as during peak shipping seasons, the long check in and out process may also result in long lines which add further delays, as the transport and drivers wait in line to have documents reviewed and otherwise validated. Additionally, the system, described herein, may reduce overhead associated with form completion, inventory tracking, and the like.

As described herein, the machine learned models may be generated using various machine learning techniques. For example, the models may be generated using one or more neural network(s). A neural network may be a biologically inspired algorithm or technique which passes input data (e.g., image and sensor data captured by the IoT computing devices) through a series of connected layers to produce an output or learned inference. Each layer in a neural network can also comprise another neural network or can comprise any number of layers (whether convolutional or not). As can be understood in the context of this disclosure, a neural network can utilize machine learning, which can refer to a broad class of such techniques in which an output is generated based on learned parameters.

As an illustrative example, one or more neural network(s) may generate any number of learned inferences or heads from the captured sensor and/or image data. In some cases, the neural network may be a trained network architecture that is end-to-end. In one example, the machine learned models may include segmenting and/or classifying extracted deep convolutional features of the sensor and/or image data into semantic data. In some cases, appropriate truth outputs of the model in the form of semantic per-pixel classifications (e.g., vehicle identifier, container identifier, driver identifier, and the like).

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like. In some cases, the system may also apply Gaussian blurs, Bayes Functions, color analyzing or processing techniques and/or a combination thereof.

FIG. 1 is an example block diagram of an architecture 100 for extracting data from transport related documents according to some implementations. In the illustrated example, the architecture 100 may include multiple systems to process the documents and extract desired data, generally indicated by extracted data 102 (e.g., one or more key value pairs). For instance, a preprocessing system 104 may receive one or more documents 106 in an electronic format. The electronic format may be an image, scan, PDF, email, attachment, as well as various other electronic formats.

As discussed above, the documents 106 may be structured documents, semi-structured documents, and/or unstructured documents. The structured documents may include legible content in specified or known formats and data arrangements and include proper grammar and sentence structure. The semi-structured documents may include content such as, tables, charts, key value pairs, and other expected data entries. The semi-structured documents and the unstructured documents may include content that is handwritten, free form, unformatted, in multiple languages, and/or unexpected key values, table entries, optical mark selections, and the like. For example, important data may be handwritten in the margins, between lines, and the like.

In this example, the preprocessing system 104 may be configured to prepare the documents 106 for processing by an optical character recognition system 108. The preprocessing system 104 may first align all pages of the document 106 to an upright or vertical position. For example, the preprocessing system 104 may detect the bottom and/or top of a page/image based on a content (such as a header, title, footer, page number, and the like). In addition to or in lieu of the content, the preprocessing system 104 may also determine the upright or vertical position using an analysis of the content (e.g., words and characters), in some cases, with respect to an edge of the image. For instance, many characters have a vertical or upright component that typically aligns with an upright position of the page (particularly, with respect to machine generated text). Thus, the preprocessing system 104 may utilize various heuristic or rule based techniques and/or machine learned models/networks to detect the machine generated content or text and determine a upright vector associated with particular portions of the text. In other cases, the preprocessing system 104 may detect lines (either implicated, such as the edge of a paragraph, or physical, such as the edge of a table) and utilize a vector associated with the line as the upright position.

In some cases, the preprocessing system 104 may utilize multiple techniques discussed above to generate an upright position and/or angle of the page. The preprocessing system 104 may assign a confidence value or score to each of the techniques and then align the page/image with the upright position based on the output of the multiple techniques and the confidence values associated with each. For example, often when capturing image data and/or scanning multiple pages of the documents 106, it is difficult to align each page to the same upright or vertical position (e.g., one or more of the pages is imaged at an angle with respect to the others), particularly, if one page is 180 degrees opposite the others. Thus, by utilizing multiple techniques, the upright position may be disambiguated from other possible alignments generated by an individual technique.

The preprocessing system 104 may also be configured to order or arrange the pages/images in a desired manner. For example, pages of the documents 106 may be out of order or become intermingled with other each other. In these examples, the preprocessing system 104 may identify or classify each image/page as belonging to a particular document and/or of a particular type. The preprocessing system 104 may then sort the images/pages based on the class and/or type. In some cases, the system may also identify page numbers or matching content and order the images/pages based on the identified page numbers and/or matching content, such that each page is associated with a corresponding document and the pages of each document are in order. In some cases, the preprocessing system 104 may utilize one or more machine models or network to order and sort the images/pages of the documents. The preprocessing system 104 may utilize confidence values associated multiple techniques to classify, sort, and/or order the pages. Then the preprocessing system 104 may generate the output arrangement based at least in part on the confidence values of the multiple techniques.

Once the documents are preprocessed and/or cleaned, the optical character recognition system 108 may generate machine readable content or text associated with the documents 106. During optical character recognition, the optical character recognition system 108 may detect text, such as machine generated characters and/or handwritten content. For instance, the optical character recognition system 108 may utilize multiple techniques for text detection. In one example, the optical character recognition system 108 may detect the text based content of the image/page and generate bounding boxes around the text in order to generate defined regions or text boxes. The optical character recognition system 108, may also at this time, detect and assign a language associated with the document. The optical character recognition system 108 may also determine if the content is in multiple languages as is often common in international trade and customs documents. The optical character recognition system 108 may then select and apply one or more optical character recognition techniques based on the quality of the defined regions or text boxes and the language(s) assigned. For instance, one or more of the optical character recognition techniques may include applying a machine learned model/network and/or a dictionary based technique in which the model, network, and/or dictionary are selected based on the one or more languages assigned.

As an example of an optical character recognition technique, the optical character recognition system 108 may perform a first text recognition technique on character by character basis and a second text recognition technique on word by word basis. In this example, the optical character recognition system 108 may generate a vector for individual characters in the first technique and individual word in the second technique. The results of the first technique and the second technique may then be merged to generate the machine readable text or content. By utilizing the word based or second technique, words may be more quickly and efficiently defined, and the corresponding machine readable text generated. Additionally, using the word based technique spelling errors may be detected and spelling corrections may be applied, and word dictionaries in the selected language may be applied to improve the output of the machine readable text.

However, simply using the word based technique may result in misclassification for single character words and/or similar words and numbers. In particular, many transit, shipping, and customs forms include alpha-numerical serial numbers that are unique, not present in a dictionary, and may include numbers as well as letters in the same string of characters. Accordingly, by using the character based technique, the optical character recognition system 108 may more reliably identify individual characters of a string and thereby provide more accurate data extraction.

The machine readable content may then be provided to and received by a classification system 110. The classification system 110 may also perform classification on the content to determine document formats or types and the like prior to data extraction. The classification system 110 may, during data extraction, be configured to extract specific key value entries based on the assigned class (e.g., the key value descriptors may be selected based on the assigned class). In some cases, the classification system 110 may utilize multiple techniques to segmenting and/or classifying the documents or individual pages of the documents. In one example, the classification system 110 may apply a text or content based technique using a text based classification model that applies a set of heuristic based rules. For example, the text or content based technique may utilize named NER techniques and/or POS tagging to classify the documents and/or pages. For instance, the text or content based technique may determine a class based on the content of the individual documents and/or pages and a set of predetermined rules or dictionaries. In this example, the classification system 110 may also determine a confidence value associated with each individual classification generated by the text or content based technique or process.

The classification system 110 may also apply a layout analysis technique to segment and classify the documents and/or pages. For example, the classification system 110 may determine font height, document colors (e.g., font colors, background colors, table colors, and the like), font weight, spacing, positions of detected key value descriptors, and the like using one or more dictionaries, or machine learned and/or heuristic based models. As discussed above, the classification system 110 may also generate a confidence value associated with each individual classification generated by the layout analysis technique or process.

The classification system 110 may also apply a second machine learned model or deep learning technique to segment and classify the documents and/or pages. For example, the classification system 110 may include a machine learned model, networks, and/or heads trained using customs, transport, shipping, and other related documents in order to segment and/or classify the documents and/or pages of the documents. For example, the first text based technique may utilize a BERT model and/or a LSTM network to classify the documents and/or pages. Once again, the classification system 110 may also generate a confidence value associated with each individual classification generated by the machine learned model and/or deep learning technique or process.

The classification system 110 may then select a classification based at least in part on the classification from each of the multiple techniques and the corresponding confidence values. For example, if greater than a first threshold number of techniques generates the same classification, the classification may be applied. If no classification equals or has greater than the first threshold number of techniques, the classification system 110 may remove techniques having a confidence value less than a second threshold and select from the remaining techniques. Alternatively, the classification system 110 may select the classification having the highest corresponding confidence value.

The classified machine readable content of the documents 106 may then be ready for data extraction. In this example, a data extraction system 112 may perform multiple types of data extraction in parallel and via multiple passes. In this example, the extracted data 102 may be removed or filtered from the machine readable content prior to each pass. Each pass may then parse the remaining machine readable content for additional data to extract until the document is substantially empty and/or all desired key value descriptors/tables are complete (e.g., the desired data is extracted). The extracted data 102 may also be digitized, virtualized, and/or otherwise stored in one or more computer-readable media.

In one example, the data extraction system 112 may be based on key value pairs (e.g., a key value descriptor and an associated or corresponding key value entry). For example, the data extraction system 112 may include subsystems for processing the content of the documents to extract addresses, contact details, optical marks, barcodes/QR codes, tables, and the like.

In some implementations, to extract the addresses the data extraction system 112 may utilize the output of the layout analysis and/or other predetermined pattern associated with a document to determine a location of an address. The data extraction system 112 may again utilize multiple techniques to identify the location of an address. For instance, the data extraction system 112 may identify instances of key value descriptors, such as "ship to", "delivery location", "origin", and the like that may indicate an address in proximity. In some cases, the key value descriptors may be associated or stored in an address dictionary. In other instances, the data extraction system 112 may utilize one or more image recognition techniques and/or machine learned models to identify a pattern of an address content of the document. The data extraction system 112 may parse the machine readable content to identify words common to an address (e.g., city, state, road designations, such as road, street, court, and the like, etc.).

Once an address is located, the data extraction system 112 may determine a bounding box and/or string associated with the address, for instance, by searching the content to the right and left of the location. The content of the bounding box may be extracted as individual components of an address, such as country, state, city, street name, street number, zip code, and the like. In some cases, the data extraction system 112 may extract and/or differentiate between the components by utilizing NER techniques and predictive matching techniques with one or more location dictionaries.

In some cases, the language for the document may indicate the location dictionary that is being used. As one illustrative example, the data extraction system 112 may identify an address and extract a city or zip code using a dictionary. The data extraction system 112 may then utilize a dictionary associated with the city or zip code to identify the street name and/or address. For instance, the street name may be misspelled but by using a local dictionary a nearest match may be found and the street name may be identified and extracted.

After the address components are extracted, the data extraction system 112 may remove the address data and any corresponding key pair descriptors from the content and then parse the content of the document for another address. In this example, the addresses are extracted and removed from the content, then another address is identified. But it should be understood that the data extraction system 112 may operate the data extraction techniques and systems, discussed herein, in parallel and remove various portions of the content also in parallel such that the amount of content being parsed may be reduced as data that is less easily identified and extracted is targeted.

The data extraction system 112 may also extract data related to contact details, such as companies, individuals, phone numbers, emails, fax numbers, and the like. In some cases, the data extraction system 112 may utilize NER techniques as well as one or more name, entity, phone number dictionaries or the like. In some cases, the dictionary may be selected based on the address of origin and/or destination. The dictionaries may also include lists of all known companies operating within a given jurisdiction and the like.

The data extraction system 112 may also include a list of key value descriptors that may be used to match or identify key value entries as discussed herein. For instance, the country code or phone number pattern may be used to assist with parsing, identifying, and extracting the phone numbers. The data extraction system 112 may also utilize POS techniques, machine learned models and/or networks, one or more heuristic based technique, and the like. The data extraction system 112 may again assign confidence values associated with the extracted contact details and utilize the confidence values to select between differing outputs of individual techniques, as discussed herein.

The data extraction system 112 may also extract data associated with dates. As one illustrative example, the date may be extracted by searching for and matching patterns known to represent a date. In some cases, the patterns may be selected based on the location of origin and/or destination. In some implementations, the data extraction system 112 may compare extracted dates with each other in order to match and determine the pattern being used within the document. For instance, a month may be both written in words as well as placed prior to a day or after a day in a numerical representation. The data extraction system 112 may utilize the written month to determine if the document is using a day-month-year format or a month-day-year format.

The data extraction system 112 may also extract optical mark recognition. For example, the documents may include selectable or checkable sections that provide specific fields of data to the reader. The data extraction system 112 may extract the selected optical marks using pattern matching (e.g., identifying the checkboxes, radio buttons, yes/no buttons, and the like). The data extraction system 112 may determine the content corresponding to the optical marks by using measurement variables or boxes about the optical mark. For instance, determining a uniform border or distance to text based content between multiple optical marks and/or distance between optical marks themselves and identifying substantially similar, corresponding, or the same distances between text based content adjacent to the optical marks. The data extraction system 112 may also utilize geometric pattern matching, and text based analysis to determine the content associated with the selected optical marks. Once identified, the content associated with the selected and/or unselected optical marks may be extracted and then removed or otherwise filtered from the document.

The data extraction system 112 may also perform data extraction techniques associated with barcodes, QR codes, stickers, other machine readable icons or representations, and the like. In some cases, the data extraction system 112 may utilize pattern matching, machine learned models/networks, image processing techniques, and the like to identify the presence of a machine readable icon. The data extraction system 112 may read the data from the machine readable icon and determine if it is duplicative or new. If the data is duplicative the system may use the data to validate the extracted data and if the data is new, the data extraction system 112 may assign the extracted data as a key value entry of the corresponding key value pair.

The data extraction system 112 may also extract table data in order to generate or provide virtual tables associated with the content. In these examples, the system may utilize different approaches for different types of tables. For instance, the data extraction system 112 may use a first set of multiple techniques for bordered tables and a second set of multiple techniques for borderless tables.

In the case of bordered tables, the data extraction system 112 may utilize techniques that perform pattern matching (such as via one or more machine learned models) to determine a location of a table. For example, the data extraction system 112 may detect borders of a table then determine the content at the location is a table by analyzing header section, footer section, spacing between rows and columns, other geometric patterns, and the like. In some cases, as a second technique or if a confidence of the table/row/column/entry detecting has low confidence, the data extraction system 112 may remove the borders from the content (e.g., using a computer vision technique) and process the bordered table using the borderless table techniques, discussed herein.

The data extraction system 112 identifies borderless tables by utilizing a pattern matching associated with geometric patterns and/or changes in geometric patterns from prior or other content of the document and/or page. As an illustrative example, the data extraction system 112 may determine the average word spacing, line spacing, and the like on a per document or per page basis. The data extraction system 112 may then compare the word spacing and line spacing for the content associated with the table. In this example, if the word spacing and/or line spacing differs from the average, then the data extraction system 112 may identify the area with the differing spacing or other geometric pattern as a table.

As a non-exhaustive list of other types of techniques of identifying a boarded and/or borderless table may include, but is not limited to, textual patterns, semantic similarity of proximate content (e.g., content above and next to), industry based dictionaries, machine learned models and/or networks, keyword or key value pair detection, utilizing vectorization word features (e.g., font size, font weight, font type, word meaning, and the like), NER techniques, domain intelligence, coreference resolution techniques, computer vision techniques, text type analysis (e.g., numerical, alphabetic, serial number, currency, measurement, and the like), heuristic based models, and the like.

In some cases, the data extraction system 112 may again assign confidence values to the location and/or content identified as pertaining to a table. The data extraction system 112 may then determine the entries, borders or bounding box of the table content using the confidence values. Likewise, the data extraction system 112 may utilize confidence values in determining using multiple techniques to identify the location, bounding box, and/or content of each individual entry of the table.

Once the table is located and the content identified, the data extraction system 112 may determine the content of the table. For example, the data extraction system 112 may utilize the content in the header sections, various column and row header entries, and geometric patterns of the body content of the table and the like to determine a subject matter or type of the table. The data extraction system 112 may also determine if entry columns are in alphabetic characters and/or numerals. If the column is numerals the system may determine a standard (e.g., dollars, euros, pounds, ounces, meters, number of units, and the like) being used and utilize the standard to assist in classing the table type or subject. In some cases, by utilizing combinations of column standards and/or one or more machine learned models, the system may classify the type or subject matter of the table. Again, once the table is identified, the type or subject matter determined, the system may parse and extract the content to generate a virtual table.

In some cases, such as in borderless tables, the data extraction system 112 may have to determine where a column/row entry ends and starts. In these cases, the data extraction system 112 may again utilize the geometric patterns. But in some cases, the entries may be handwritten or otherwise extend into a second column or row. In these cases, the data extraction system 112 may parse the content to determine semantically related content and organize the semantically related content as associated with a particular table location or entry. Again, as each entry/table is extracted, the system may remove the content from the document and re-process the table/page/document to reduce the content remaining at each pass and thereby reduce the complexity at each pass.

The system may also extract data associated with values (payment amounts, price per units, and the like), inventory identifiers, and the like. In some cases, the additional data extracted may be based on the classification of the document and/or page as well as based on the aliases detected and assigned. As one illustrative example, the date may be extracted by searching for and matching patterns known to represent a date. In some cases, the patterns may be selected based on the location of origin and/or destination. In some implementations, the data extraction system 112 may compare extracted dates with each other in order to match and determine the pattern being used within the document. For instance, a month may be both written in words as well as placed prior to a day or after a day in a numerical representation. The data extraction system 112 may utilize the written month to determine if the document is using a day-month-year format or a month-day-year format.

The extracted data 102 may then be stored and/or provided to various third party systems. For example, the extracted data 102 may be provided to various governmental and/or customs systems, a seller system, a buyer system, a system associated with the destination, a system associated with the transport company, a system associated with the point or origin, a system associated with insurance, a system associated with chain of custody, and the like.

Figure 2:
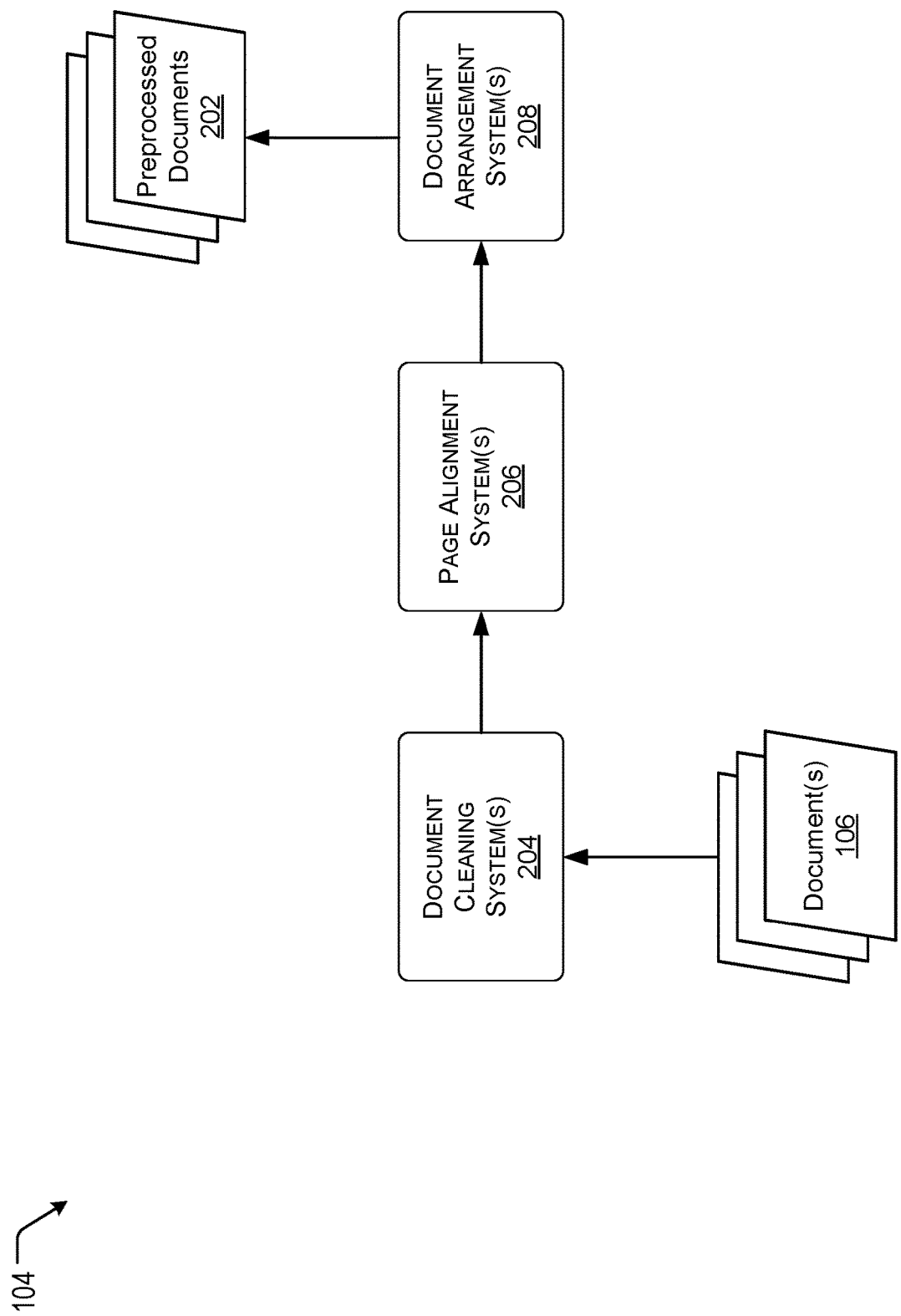
FIG. 2 is an example block diagram of an architecture of a preprocessing system of FIG. 1 according to some implementations.

FIG. 2 is an example block diagram of an architecture of a preprocessing system 104 of FIG. 1 according to some implementations. In the current example, the preprocessing system 104 may be configured to receive documents 106 and to output as a response preprocessed documents 202, which are ready for optical character recognition. The preprocessed documents 202 may have defects or imperfections (e.g., watermarks, ink blots, food/water stains, and the like) removed or lightened with respect to the content, the pages aligned into a common upright vector, and/or the pages sorted and ordered in one or more predefined pattern (e.g., by page number, page type, content, or the like).

In the current example, the preprocessing system 104 may include a document cleaning system 204, a page alignment system 206, and a document arrangement system 208. The page cleaning system 204 may be configured to convert the documents 106 to images, if they are not already in an image based format. The page cleaning system 204 may then be configured to remove imperfections from the images. For example, the page cleaning system 204 may utilize a machine learned model to generate bounding boxes associated with the imperfections and/or content of the images. The page cleaning system 204 may then modify brightness, contrast, saturation, and the like with respect to the content (e.g., to darken the content) and the imperfections (e.g., to lighten the imperfections) to improve the output of the future applied optical character recognition techniques.

The page alignment system 206 may also determine an upright or vertical position of individual pages or images and using the detected angle or orientation to rotate the images to align each of the pages/images to the upright or vertical position. For example, the page alignment system 206 may detect the bottom and/or top of a page/image based on a content (such as a header, title, footer, page number, and the like). In addition to or in lieu of the content, the page alignment system 206 may also determine the upright or vertical position using an analysis of the content (e.g., words and characters), in some cases, with respect to an edge of the image. For instance, many characters have a vertical or upright component that typically aligns with an upright position of the page (particularly, with respect to machine generated text). Thus, the page alignment system 206 may utilize various heuristic or rule based techniques and/or machine learned models/networks to detect the machine generated content or text and determine a upright vector associated with particular portions of the text. In other cases, the page alignment system 206 may detect lines (either implicated, such as the edge of a paragraph, or physical, such as the edge of a table) and utilize a vector associated with the line as the upright position.

In some cases, the page alignment system 206 may utilize multiple techniques discussed above to generate an upright position and/or angle of the page. The page alignment system 206 may assign a confidence value or score to each of the techniques and then align the page/image with the upright position based on the output of the multiple techniques and the confidence values associated with each. For example, often when capturing image data and/or scanning multiple pages of a document or documents, it is difficult to align each page to the same upright or vertical position (e.g., one or more of the pages is imaged at an angle with respect to the others), particularly, if one page is 180 degrees opposite the others. Thus, by utilizing multiple techniques, page alignment system 206 may disambiguate the upright position from other possible alignments generated by an individual technique.

The document arrangement system 208 may be configured to order or arrange the pages/images in a desired manner. For example, the documents may be out of order or become intermingled with other documents (e.g., a page of a first document is scanned or imaged between pages of a second document). In these examples, the document arrangement system 208 may identify each image/page as belonging to a particular document and/or of a particular type. The document arrangement system 208 may then sort the images/pages based on the type. In some cases, the document arrangement system 208 may also identify page numbers or matching content and order the images/pages based on the identified page numbers and/or matching content, such that each page is associated with a corresponding document and the pages of each document are in order. In some cases, the document arrangement system 208 may utilize one or more machine models or network to order and sort the images/pages of the documents. The document arrangement system 208 may utilize confidence values associated multiple techniques to classify, sort, and/or order the pages. Then the document arrangement system 208 may generate the output arrangement based at least in part on the confidence values of the multiple techniques.

Figure 3:
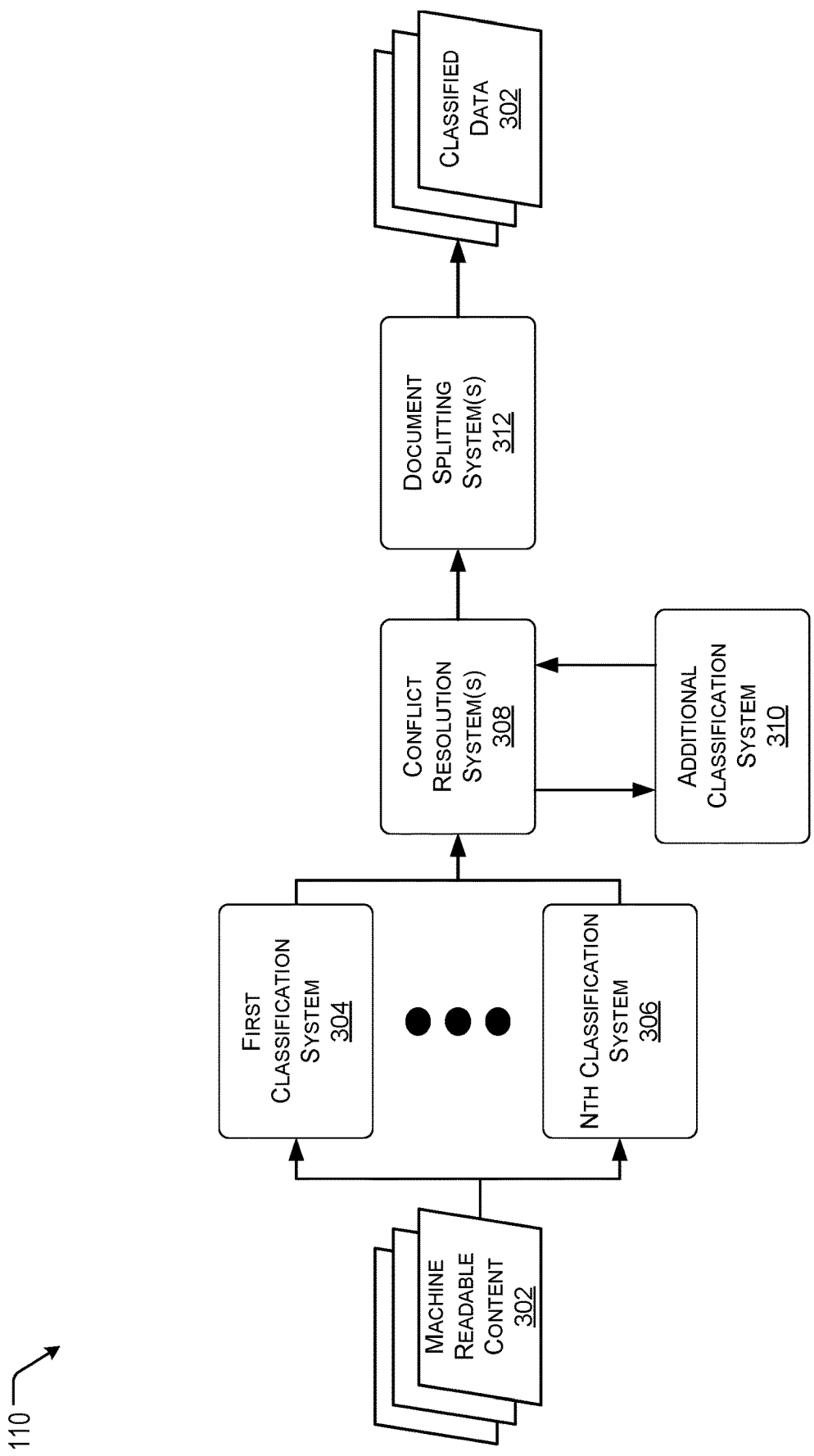
FIG. 3 is an example block diagram of an architecture of a classification system of FIG. 1 according to some implementations.

FIG. 3 is an example block diagram of an architecture of a classification system 110 of FIG. 1 according to some implementations. In the illustrated example, the classification system 110 may receive machine readable content 302 from an optical character recognition system, such as optical character recognition system 108 of FIG. 1. The classification system 110 may then input the machine readable content 302 into multiple classification systems, such as the illustrated first classification system 304 and nth classification system 306.

In some cases, the first classification system 304 and the nth classification system 306 may include classification techniques such as text analysis, key value descriptors or key word searches, machine learned models and/or networks (such as NER and POS tagging), layout analysis (e.g., font height, color, and/or weight; word and character spacing; and the like), context building, computer vision analysis, domain intelligence, and the like.

As one illustrative example, the first classification system 304 may apply a text or content based technique using a text based classification model that applies a set of heuristic based rules. In this manner, the first classification system 304 may determine a first class for the machine readable content 302 based on the content of the individual documents and/or pages and a set of predetermined rules or dictionaries. In this example, the first classification system 304 may also determine a confidence value associated with each individual classification generated. Both the first class and the first confidence value may be provided to the conflict resolution system 308.

Similarly, the Nth classification system 306 may apply a layout analysis technique to segment and classify the machine readable content 302. For example, the Nth classification system 306 may determine font height, document colors (e.g., font colors, background colors, table colors, and the like), font weight, spacing, positions of detected key value descriptors, and the like using one or more dictionaries or machine learned and/or heuristic based models. The Nth classification system 306 may generate an Nth class and an Nth confidence value associated with each individual classification generated by the layout analysis technique or process. Again, both the Nth class and the Nth confidence value may be provided to the conflict resolution system 308.

As some illustrative examples, additional or alternative classification systems may apply machine learned model or deep learning techniques to segment and classify the machine readable content 302. For example, the classification system(s) may include machine learned models, networks, and/or heads trained using customs, transport, shipping, and other related documents in order to segment and/or classify the documents and/or pages of the documents. As other examples, the classification system may utilize a BERT model and/or a LSTM network to classify the machine readable content 302.

The conflict resolution system 308 may then select a classification from the set of K classes (e.g., up to N classes) based at least in part on the first class and the first confidence value and the Nth class and the Nth confidence value. For example, if the first class and the second class match, the conflict resolution system may select the class and assign it to the machine readable content 302. However, if the first class and the Nth class do not match, the conflict resolution system may select between the classes represented in the set of K classes. For example, if the first class has a corresponding first confidence value of greater than a first threshold and the Nth class has a corresponding Nth confidence value of less than a second threshold, the conflict resolution system 308 may select the first class as the class for the machine readable content 302. However, if both the first class and the Nth class have corresponding confidence values below a threshold or within a threshold difference of each other, the conflict resolution system 308 may cause an additional classification system 310 to generate a tie breaker classification and tie breaker confidence value. The tie breaker classification system 310 may apply a different classification technique, models, and/or networks than the first classification system 304 and the nth classification system 306 and the conflict resolution system 308 may select the class based on the set of K classes and the tie breaker classification as well as the corresponding confidence values output by each system 304, 306, and 310. In this manner, the tie breaker additional classification system 310 may only be utilized in a low number of instances, thereby improving the overall processing speed and reducing the overall resource consumption of the classification system 110.

Figure 4:
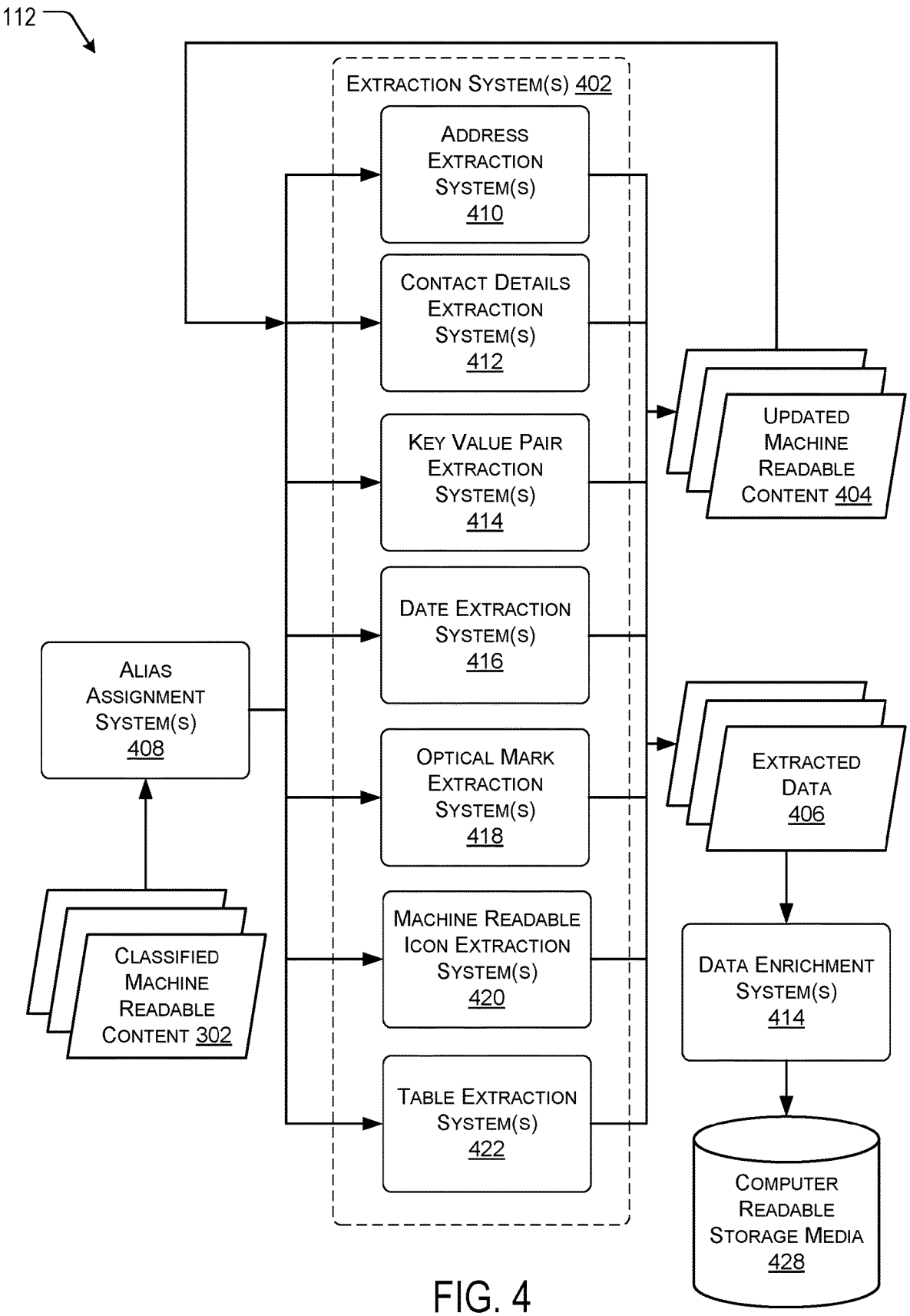
FIG. 4 is an example block diagram of an architecture of a data extraction system of FIG. 1 according to some implementations.

FIG. 4 is an example block diagram of an architecture of a data extraction system 112 of FIG. 1 according to some implementations. In the current example, the data extraction system 112 may include multiple data extraction systems, generally indicated by 402. In this example, the individual extraction systems 402 may extract data from the classified machine readable content 302 output by, for instance, the classification system 110 of FIGS. 1 and 3. The extraction systems 402 may output both an updated machine readable content 404 and/or extracted data 406. In this example, the updated machine readable content 404 may include the classified machine readable content 302 filtered to remove the extracted data 406. In this manner, the extraction systems 402 may re-process the updated machine readable content 404 via additional passes to on, for instance, each pass reducing the computational complexity with respect to extracting data.

In the illustrated example, the data extraction system 112 may include an alias assignment system 408. The alias assignment system 408 may be configured to assign aliases to the classified machine readable content 302 using one or more alias dictionaries. For example, in some documents the term "ship to" may be used as a standard designation for the term "destination". In this example, the alias assignment system 408 may identify the corresponding terms within the alias dictionary and assign each the same key value descriptors in preparation for processing by the data extraction systems 402.

In the current example, the data extraction systems may include an address extraction system 410, a contact details extraction system 412, a key value pair extraction system 414, date extraction system 416, an optical mark extraction system 418, a machine readable icon extraction system 420, and/or a table extraction system 422. The address extraction system 410 may be configured to utilize a layout analysis and/or other predetermined pattern matching technique to determine a location of an address. For instance, the system may identify instances of key value descriptors, such as "ship to", "delivery location", "origin", and the like that may indicate an address in proximity. In other examples, the address extraction system 410 may determine a location of an address by identifying words such as jurisdictional names, street names, numerical strings repressing zip codes street numbers, and the like.

Once an address is located, the address extraction system 410 may determine a bounding box and/or string associated with the address, for instance, by searching the content to the right and left of the location. The content of the bounding box may be extracted as individual components of an address, such as country, state, city, street name, street number, zip code, and the like. In some cases, the address extraction system 410 may extract and/or differentiate between the components by utilizing NER techniques and predictive matching techniques with one or more location dictionaries (e.g., a street name dictionary associated with a particular city or township).

The address extraction system 410 may assign confidence values associated with the extracted address components and utilize the confidence values to select between differing outputs of individual techniques, as discussed herein. After the address components are extracted, the address extraction system 410 may remove the address data and any corresponding key pair descriptors from the machine readable content 404 and then provide the updated machine readable content 404 back to the extraction systems 402 for an additional pass.

The contact details extraction system 412 may also extract data 406 related to contact details, such as companies, individuals, phone numbers, emails, fax numbers, and the like. In some cases, the contact details extraction system 412 may utilize a NER techniques as well as one or more name, entity, phone number dictionary or the like. In some cases, the dictionary may be selected based on the address of origin and/or destination. The dictionaries may also include lists of all known companies operating within a given jurisdiction and the like.

The contact details extraction system 412 may assign confidence values associated with the extracted contact details and utilize the confidence values to select between differing outputs of individual techniques, as discussed herein. After the contact details are extracted, the contact details extraction system 412 may remove the contact details and any corresponding key pair descriptors from the machine readable content 404 and then provide the updated machine readable content 404 back to the extraction systems 402 for an additional pass.

The key value pair extraction system 414 may extract data using one or more lists of key value descriptors that may be used to match or identify key value entries as discussed herein. For instance, the country code or phone number pattern may be used to assist with parsing, identifying, and extracting the phone numbers. The key value pair extraction system 414 may also utilize POS tagging techniques, machine learned models and/or networks, one or more heuristic based technique, and the like.

The key value pair extraction system 414 may again assign confidence values associated with the extracted key value pairs and utilize the confidence values to select between differing outputs of individual techniques, as discussed herein. After the key value pairs are extracted, the key value pair extraction system 414 may also remove the key value descriptors and/or key value entries from the machine readable content 404 and then provide the updated machine readable content 404 back to the extraction systems 402 for an additional pass.

The date extraction system 416 may also extract data associated with dates. As one illustrative example, the date may be extracted by searching for and matching patterns known to represent a date. In some cases, the patterns may be selected based on the location of origin and/or destination. In some implementations, the date extraction system 416 may compare extracted dates with each other in order to match and determine the pattern being used within the document. For instance, a month may be both written in words as well as placed prior to a day or after a day in a numerical representation. The date extraction system 416 may utilize the written month to determine if the document is using a day-month-year format or a month-day-year format.

The date extraction system 416 may again assign confidence values associated with the extracted dates and utilize the confidence values to select between differing outputs of individual techniques, as discussed herein. After the dates are extracted, the date extraction system 416 may also remove the dates any related key value descriptors from the machine readable content 404 and then provide the updated machine readable content 404 back to the extraction systems 402 for an additional pass.

The optical mark extraction system 418 may also extract optical mark recognition. For example, the documents may include selectable or checkable sections that provide specific fields of data to the reader. The optical mark extraction system 418 may extract the selected optical marks using pattern matching (e.g., identifying the checkboxes, radio buttons, yes/no buttons, and the like). The optical mark extraction system 418 may determine the content corresponding to the optical marks by using measurement variables or boxes about the optical mark. For instance, the determining a uniform border or distance to text based content between multiple optical marks and/or distance between optical marks themselves and identifying substantially similar, corresponding, or the same distances between text based content adjacent to the optical marks. The optical mark extraction system 418 may also utilize geometric pattern matching, and text based analysis to determine the content associated with the selected optical marks. Once identified, the content associated with the selected and/or unselected optical marks may be extracted and then removed or otherwise filtered from the document.

The optical mark extraction system 418 may also assign confidence values associated with the extracted optical marks and utilize the confidence values to select between differing outputs of individual techniques, as discussed herein. After the optical mark related content is extracted, the optical mark extraction system 418 may also remove the optical mark related content any related key value descriptors from the machine readable content 404 and then provide the updated machine readable content 404 back to the extraction systems 402 for an additional pass.

The machine readable icon extraction system 420 may also perform data extraction techniques associated with barcodes, QR codes, stickers, other machine readable icons or representations, and the like. In some cases, the machine readable icon extraction system 420 may utilize pattern matching, machine learned models/networks, image processing techniques, and the like to identify the presence of a machine readable icon. The machine readable icon extraction system 420 may read the data from the machine readable icon and determine if it is duplicative or new. If the data is duplicative the machine readable icon extraction system 420 may use the data to validate the extracted data and if the data is new, the system may assign the extracted data as a key value entry of the corresponding key value pair.

The machine readable icon extraction system 420 may also assign confidence values associated with the extracted machine readable icons and utilize the confidence values to select between differing outputs of individual techniques, as discussed herein. After the icon related content is extracted, the machine readable icon extraction system 420 may also remove the icon related content any related key value descriptors from the machine readable content 404 and then provide the updated machine readable content 404 back to the extraction systems 402 for an additional pass.

The table extraction system 422 may also extract table data in order to generate or provide virtual tables associated with the content. In these examples, the system may utilize different approaches for different types of tables, discussed in more detail below with respect to FIG. 5. For instance, the table extraction system 422 may a first set of multiple techniques for bordered tables and a second set of multiple techniques for borderless tables. The table extraction system 422 may also assign confidence values associated with the extracted tables and utilize the confidence values to select between differing outputs of individual techniques, as discussed herein. After the tables are extracted, the table extraction system 422 may also remove the tables from the machine readable content 404 and then provide the updated machine readable content 404 back to the extraction systems 402 for an additional pass.

Once the extracted data 406 is removed from the machine readable content 302, the extracted data 406 may be processed by a data enrichment system 424. The data enrichment system 422 may be configured to perform key value conflict resolution, such as when multiple key value entries correspond to the same key value descriptor. In some cases, the data enrichment system 422 may, for instance, convert values in different currencies or denominations to the same standard and compare the values. The data enrichment system 422 may also sum columns and rows and/or apply checksums to various values to identify if one or more of the values are inaccurate or include errors.

The data enrichment system 422 may also determine values of the missing key entries using the extracted data 406. For example, if a city and street name are extracted but a state is not extracted, the data enrichment system 422 may utilize one or more databases to determine the state associated with the city and street. As another example, the data enrichment system 422 may utilize extracted SWIFT codes to access and populate missing banking details. In this manner, the data enrichment system 422 may utilize public and private third-party databases to complete missing information and/or confirm key value entries are accurate and complete. In other cases, the data enrichment system 422 may confirm dates such as by using contract terms. The data enrichment system 422 may also perform spelling and grammar checking and the like on the extracted data 406. After enrichment, the extracted data 406 may be stored in one or more computer readable storage media 428 and/or sent to various third-party systems (not shown).

Figure 5:
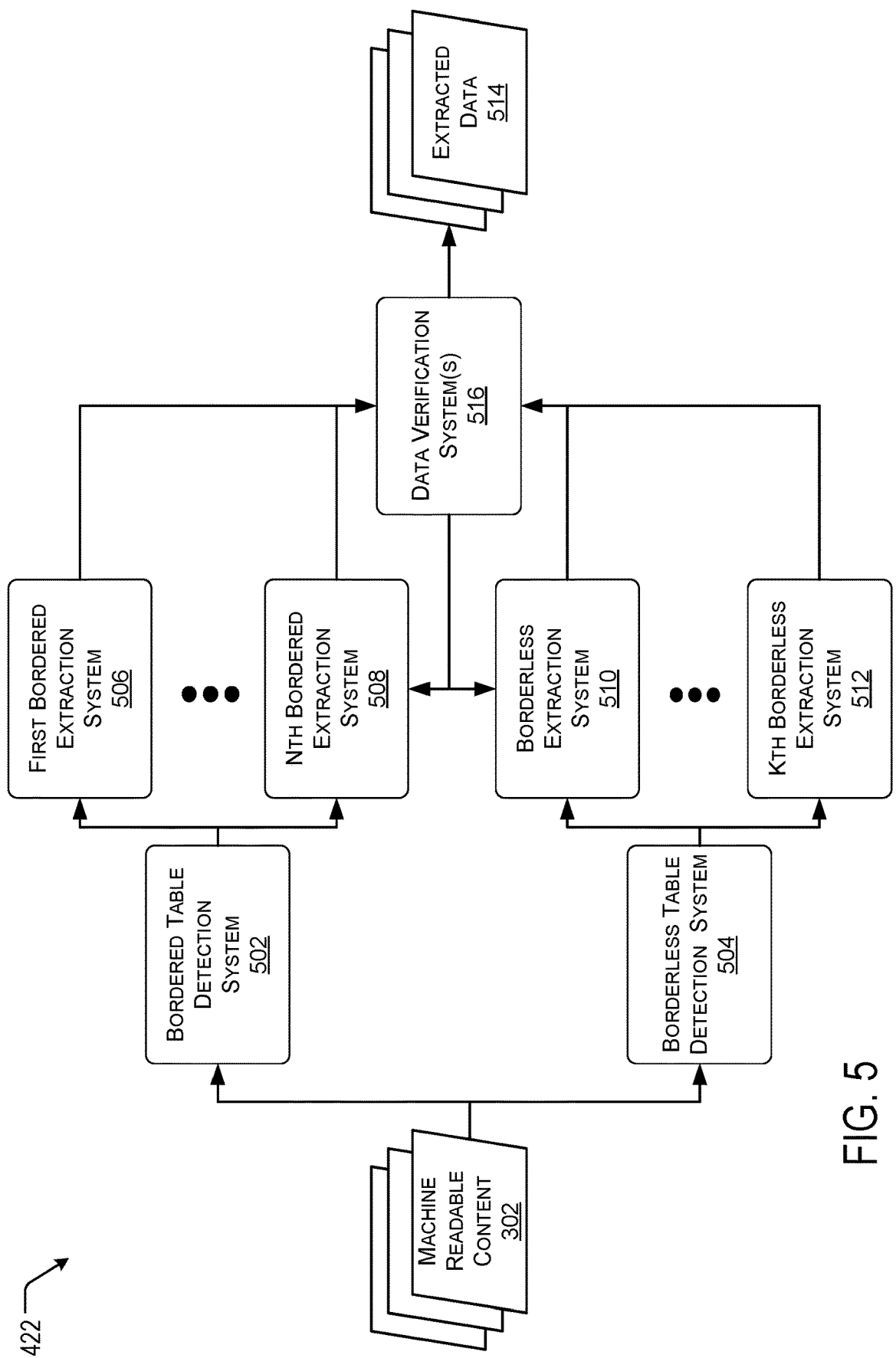
FIG. 5 is an example block diagram of an architecture of a data extraction system of FIG. 1 according to some implementations.

FIG. 5 is an example block diagram of an architecture of a data extraction system 422 of FIG. 1 according to some implementations. In the current example, the data extraction 422 may be configured to extract table data using multiple techniques. In this example, the data extraction system 422 may utilize different systems or techniques to extract data from bordered tables and borderless tables as illustrated. Again, the system 422 may receive the machine readable content 302 either as an original or as part of a subsequent pass (e.g., a return of the machine readable content 302 after a first data extraction pass and filtering, as discussed above).

The machine readable content 302 may be received at a bordered table detection system 502 as well as at a borderless table detection system 504. The bordered table detection system 502 may utilize pattern matching (such as via one or more machine learned models) to determine a location of a table. For example, the bordered table detection system 502 may detect borders of a table then determine a bounding box associated with the content of the table by analyzing header section, footer section, spacing between rows and columns, other geometric patterns, and the like.

The borderless table detection system 504 may also utilize a pattern matching technique to determine the location of a table. In this example, the borderless table detection system 504 may utilize geometric patterns of the table content with respect to patterns of the remainder of the document. As an illustrative example, the borderless table detection system 504 may determine the average word spacing, line spacing, and the like on a per document or per page basis. The borderless table detection system 504 may then compare the word spacing and line spacing for the content associated with the table. In this example, if the word spacing and/or line spacing differ from the average, then the borderless table detection system 504 may identify the area with the differing spacing or other geometric pattern as a table.

In some cases, the detection systems 502 and/or 504 may again assign confidence values to the location and/or content identified as pertaining to a table. The detection systems 502 and/or 504 may utilize confidence values in disambiguating the position or content of the table between outputs of multiple techniques to.

Once a table is detected and/or located, one or more bordered extraction systems 506-508 may be applied to extract the data 514 from the bordered tables and one or more borderless extraction systems 510-512 may be applied to extract the data 514 from the borderless tables. For example, the systems 506-508 may extract content or data 514 from the tables by analyzing the header section, footer section, spacing between rows and columns, other geometric patterns, and the like. In some cases, the systems 510-512 may utilize the content in the header sections, various column and row header entries, and geometric patterns of the body content of the table and the like to determine a subject matter or type of the table. The systems 510-512 may also determine if entry columns are in alphabetic characters and/or numerals. If the column is numerals the systems 510-512 may determine a standard (e.g., dollars, euros, pounds, ounces, meters, number of units, and the like) being used and utilize the standard to assist in classing the table type or subject. In some cases, by utilizing combinations of column standards and/or one or more machine learned models, the system may classify the type or subject matter of the table. Again, once the table is identified, the type or subject matter determined, the systems 510-512 may parse and extract the content to generate a virtual table. As other examples, the systems 506-508 may extract content or dates using techniques such as textual patterns, semantic similarity of proximate content (e.g., content above and next to), industry based dictionaries, machine learned models and/or networks, keyword or key value pair detection, utilizing vectorization word features (e.g., font size, font weight, font type, word meaning, and the like), NER techniques, domain intelligence, coreference resolution techniques, computer vision techniques, text type analysis (e.g., numerical, alphabetic, serial number, currency, measurement, and the like), heuristic based models, and the like.

In some cases, such as in borderless tables, the systems 510-512 may have to determine where a column/row entry ends and starts. In these cases, the system may again utilize the geometric patterns. But in some cases, the entries may be handwritten or otherwise extend into a second column or row. In these cases, the systems 510-512 may parse the content to determine semantically related content and organize the semantically related content as associated with a particular table location or entry. Again, as each entry/table is extracted, the systems 510-512 may remove the content from the document and re-process the table/page/document to reduce the content remaining at each pass and thereby reduce the complexity at each pass.

The systems 510-512 may also extract data 514 associated with values (payment amounts, price per units, and the like), inventory identifiers, and the like. In some cases, the additional data extracted may be based on the classification of the document and/or page as well as based on the aliases detected and assigned. As one illustrative example, the date may be extracted by searching for and matching patterns known to represent a date. In some cases, the patterns may be selected based on the location of origin and/or destination. In some implementations, the systems 510-512 may compare extracted dates with each other in order to match and determine the pattern being used within the document. For instance, a month may be both written in words as well as placed prior to a day or after a day in a numerical representation. The systems 510-512 may utilize the written month to determine if the document is using a day-month-year format or a month-day-year format.

In some cases, the systems 422 may also include a data verification system 516 that may also perform key value conflict resolution, such as when multiple key value entries correspond to the same key value descriptor. In some cases, the data verification system 516 may, for instance, convert values in different currencies or denominations to the same standard and compare the values. The data verification system 516 may also sum columns and rows and/or apply checksums to various values to identify if one or more of the values are inaccurate or includes errors.

In some specific cases, if a bordered table is not extracted or encounters issues at the data verification system 516, the content of the bordered table may be processed by the borderless extraction systems 510-512. For instance, if a user ignored the table boundaries when completing the table, the bordered extraction systems 506-508 may have difficulty in extracting the content that overruns the borders. In these cases, the data verification system 516 may cause the borderless extraction systems 510-512 to also process the content of the table and then verify the output by comparing the extracted data 514 of both the bordered extraction systems 506-508 and the borderless extraction systems 510-512.

FIGS. 6-16 are flow diagrams illustrating example processes associated with a data extraction system discussed herein. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, when executed by one or more processor(s), performs the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 6:
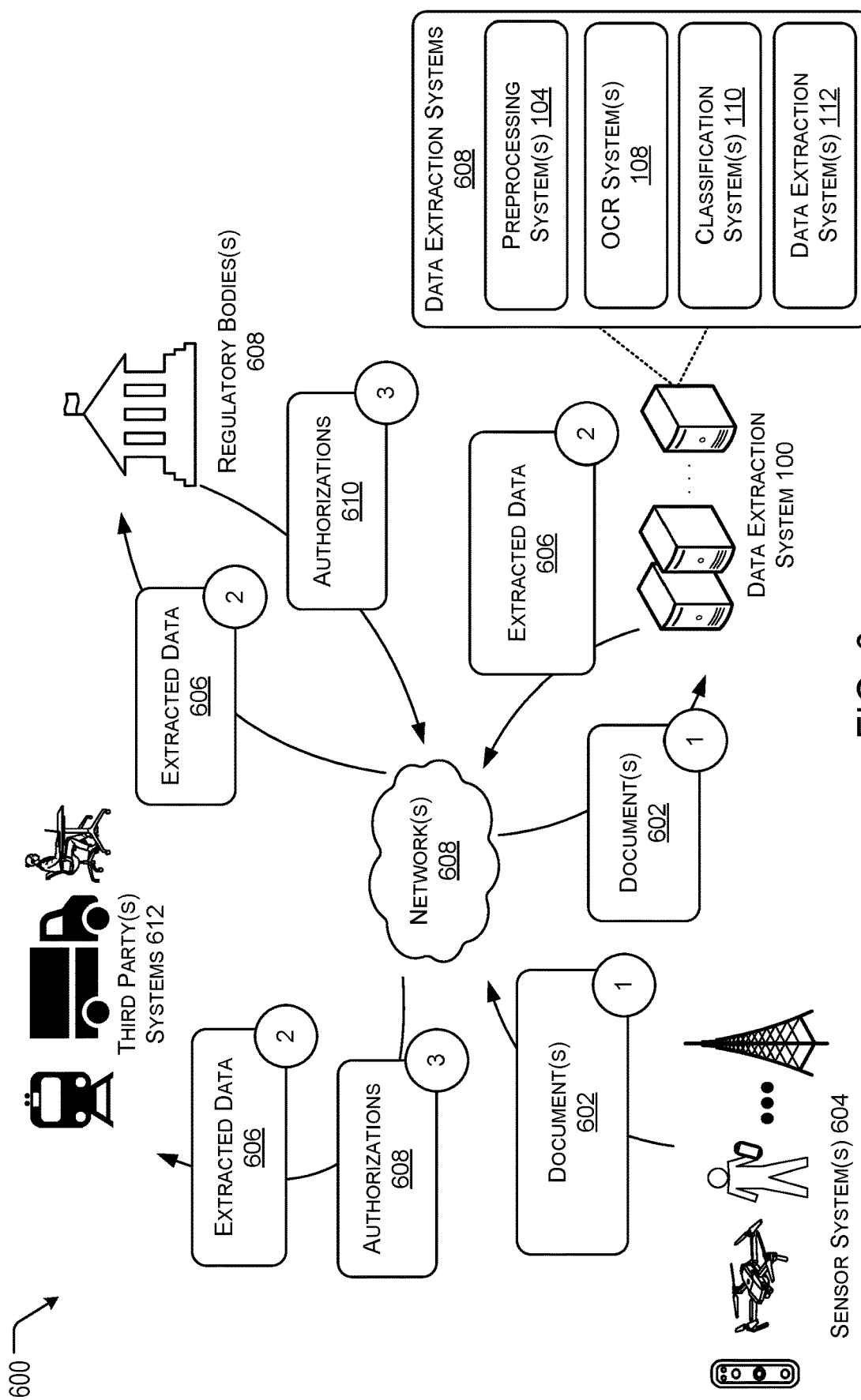
FIG. 6 is a flow diagram illustrating an example process associated with the data extraction system of FIG. 1 according to some implementations.

FIG. 6 is a flow diagram illustrating an example process 600 associated with the data extraction system according to some implementations. As illustrated, documents 602 may be generated by various sensor systems 604 as well as via email or other electronic means. The documents 602 may be received by a data extraction system 100 of FIG. 1. As discussed above, the data extraction system 100 may include preprocessing systems 104, OCR system 108, classification system 110, and data extraction system 112.

In this example, the data extraction system 100 may output extracted data 606. The extracted data 606 may include various key value pairs, virtual tables, and other data associated with the transport and delivery of various assets. In some cases, the extracted data 606 may be provided to various regulatory bodies 608 to receive authorizations 610 and/or approvals. For instance, the regulatory bodies 608 may include customs systems and the like. The extracted data 606 and/or the authorizations 610 may then be provided to one or more third party systems 612, such as a system associated with a buyer, a seller, a transport agency, a facility (origin and/or receiving), and the like.

Figure 7:
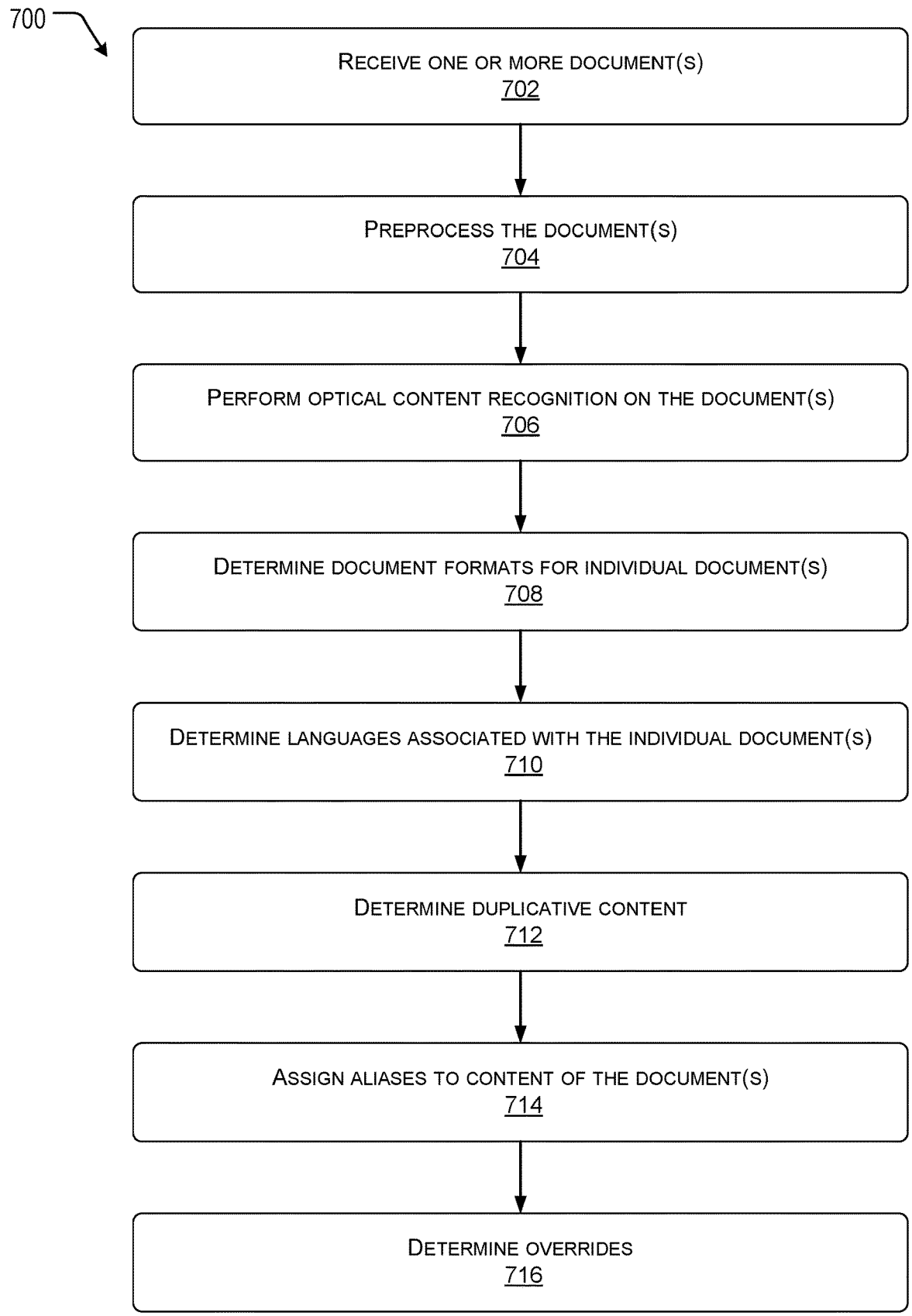
FIG. 7 is a flow diagram illustrating an example process associated with the data extraction system of FIG. 1 according to some implementations.

FIG. 7 is a flow diagram illustrating an example process 700 associated with the data extraction system of FIG. 1 according to some implementations. As discussed above, a data extraction system may be configured to parse structured, unstructured, and semi-structured documents to extract key value pairs and other usable data related to the transport and delivery of assets between multiple locations and/or facilities.

At 702, the data extraction system may receive one or more documents. As discussed herein, the documents may be scanned or imaged copies of physical documents as well as electronic documents (such as attachments to emails and the like). In some cases, the documents may include images or sensor data of vehicles, license plates and identifiers, cargo and/or shipping containers, and the like in addition to the actual documentation (e.g., forms, tables, bills of lading, and the like).

At 704, the data extraction system may preprocess the documents, as discussed above. For example, the system may convert the documents to images or another similar format. The system may also arrange the documents (e.g., align with an upright vector, order the pages of the documents, and the like) and remove imperfections, such as stains, damage marks, watermarks, and the like.

At 706, the data extraction system may perform optical content recognition on the documents, as discussed above. In this manner, the data extraction system may generate machine readable content that may be parsed and extracted as individual elements.

At 708, the data extraction system may determine document formats for individual documents. For example, the system may determine a type or classification for each page, portion of a page, document, and the like. In some cases, the system may select key value descriptors (e.g., the types of data to extract) based at least in part on the formats detected and/or assigned.

At 710, the data extraction system may determine languages associated with the individual documents. For example, documents may include duplicate content in multiple languages, may have different languages from each other, and the like. In some cases, the system may assign the language to each document, page or other portion of the document based on one or more language dictionary. In some cases, the data extraction system may convert or generate a machine translation of the content to provide the content of the documents in a uniform language.

At 712, the data extraction system may determine the existence of duplicate content. For example, the content may be included in the documents in two or more languages, two or more currencies, and the like. The data extraction system may identify the duplicative content and filter and/or otherwise remove the duplicative content, such that only a single copy remains during data extraction.

At 714, the data extraction system may assign aliases to the machine readable content of the documents. For instance, the data extraction system may maintain dictionaries of aliases that different regions, jurisdictions, companies, organizations, and the like to use with respect to particular types of data. As an illustrative example, some documents may use the term "ship to" while others use the term "destination".

At 716, the data extraction system may determine overrides between portions of the content. For example, in some cases, there may be notes, emails, or other content that overrides or changes other content within the documents. In these cases, the data extraction system may identify the references to the other content and either replace the content, filter, and/or otherwise remove the replaced content from the documents prior to data extortion.

Figure 8:
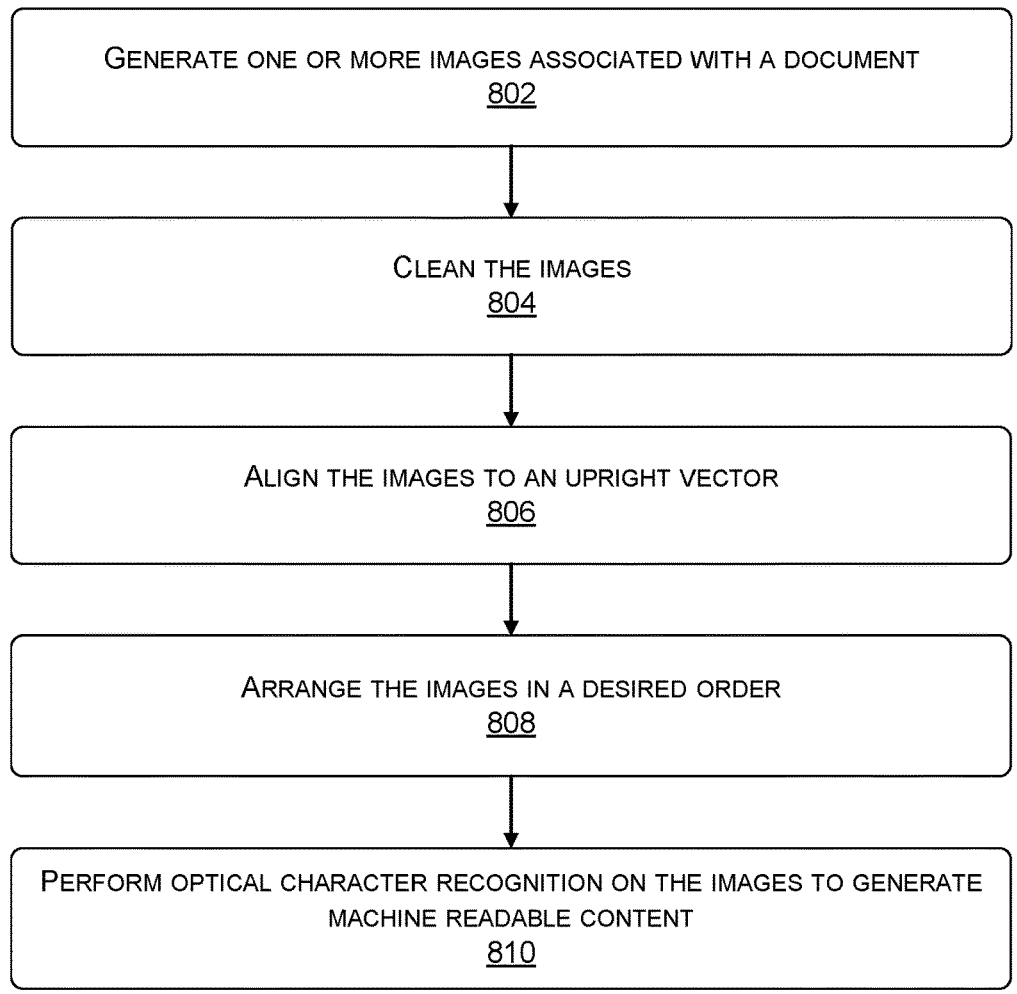
FIG. 8 is a flow diagram illustrating an example process associated with the preprocessing system of FIG. 1 according to some implementations.

FIG. 8 is a flow diagram illustrating an example process 800 associated with the preprocessing system 104 of FIG. 1 according to some implementations. As discussed above, the data extraction system may be configured to process the documents prior to performing optical character recognition to generate the machine readable content. In this manner, a more accurate machine readable content may be generated.

At 802, the preprocessing system may generate an image associated with a document, as discussed above. For example, the preprocessing system may convert each of the pages of the one or more documents received into a standard format, such as a JPEG, PDF, PNG, GIF, or the like.

At 804, the preprocessing system may clean the image, as discussed above. For example, the preprocessing system may remove imperfections by utilizing image processing techniques, machine learning, and the like to identify text based content from the imperfections, such as blots, smudges, damage, watermarks, and the like. In some cases, the preprocessing system may assign bounding boxes or regions to the imperfections and/or the text based content and modify brightness, contrast, saturation, and the like with respect to the text based content (e.g., to darken the content) and the imperfections (e.g., to lighten the imperfections). In this manner, the output of the future optical character recognition may be less likely to be obstructed or incorporate content associated with the imperfections.

At 806, the preprocessing system may align the image with a desired upright vector, as discussed above. For example, the preprocessing system may detect the bottom and/or top of the image based on a content (such as a header, title, footer, page number, and the like). In other examples, the preprocessing system may also determine the upright or vertical position using an analysis of the content (e.g., words and characters), such as portions of individual characters within the content. The preprocessing system may then rotate the image to align a vector associated with the image to the desired upright vector.

At 808, the preprocessing system may arrange the images in a desired order, as discussed above. For instance, the pages of a document may be out of order. In this example, the preprocessing system may identify the desired order based on content matching, pattern matching, machine learned models/networks, and the like. The preprocessing system may then reorder the images to the desired or originally intended order.

At 810, the data extraction system may perform optical character recognition on the images to generate a machine readable content, as discussed herein.

Figure 9:
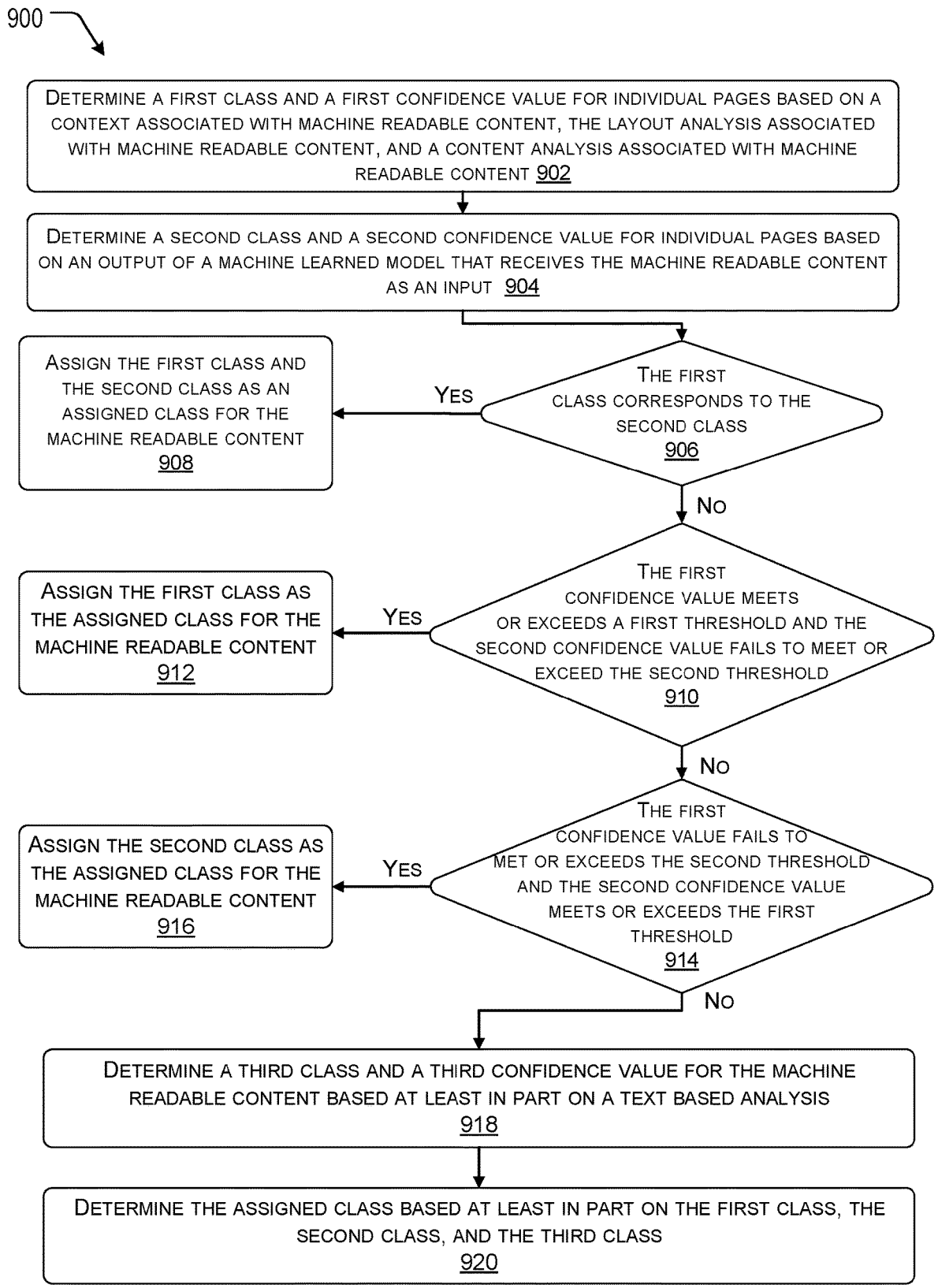
FIG. 9 is a flow diagram illustrating an example process associated with the classification system of FIG. 1 according to some implementations.

FIG. 9 is a flow diagram illustrating an example process 900 associated with the classification system 110 of FIG. 1 according to some implementations. As discussed above, the data extraction system may classify individual documents, individual pages of the documents, or individual portions of content associated with the documents based at least in part on the machine readable content and prior to performing data extraction. In general, the classification may include multiple techniques that utilize confidence values to disambiguate between techniques that generated different classifications for the same and/or overlapping content.

At 902, the classification system may determine a first class and a first confidence value for individual pages based on a context associated with machine readable content, the layout analysis associated with machine readable content, and a content analysis associated with machine readable content. For example, the classification system may utilize a set of predefined rules, heuristics, and/or historical data to generate the first class and the first confidence value, as discussed above.

At 904, the classification system may determine a second class and a second confidence value for individual pages based on an output of a machine learned model that receives the machine readable content as an input. For example, the classification system may utilize one or more machine learned models and/or networks trained using transportation documents and forms to generate the second class and the second confidence value, as discussed above, as discussed above.

At 906, the classification system may determine if the first class corresponds to the second class. If so, the process 900 may proceed to 908. At 908, the classification system may assign the first class and the second class as an assigned class for the machine readable content (e.g., the document, page, and/or portion). However, if the first class does not correspond to the second class, the process 900 may advance to 910.

At 910, the classification system may determine if the first confidence value meets or exceeds a first threshold and the second confidence value fails to meet or exceed the second threshold. For example, the first threshold may represent a threshold at which the confidence value is high enough to assign the corresponding class and the second threshold may present a value at which the confidence value is low enough to discard the class. If the first confidence value does meet or exceed the first threshold and the second confidence value does not meet or exceed the second threshold, the process 900 may move to 912, and, at 912, the classification system may assign the first class as the assigned class for the machine readable content. However, if either the first confidence value fails to meet or exceed the first threshold or the second confidence value meets or exceeds the second threshold, the process 900 advances to 914.

At 914, the classification system may determine if the first confidence value fails to meet or exceeds the second threshold and the second confidence value meets or exceeds the first threshold. If the first confidence value does not meet or exceed the second threshold and the second confidence value does meet or exceed the first threshold, the process 900 may move to 916, and, at 916, the classification system may assign the second class as the assigned class for the machine readable content. However, if either the first confidence value meets or exceed the second threshold or the second confidence value fails to meet or exceed the first threshold, the process 900 advances to 918.

At 918, the classification system may determine a third class and a third confidence value for the machine readable content based at least in part on a text based analysis, as discussed above.

At 920, the classification system may determine the assigned class based at least in part on the first class, the second class, and the third class. For example, if the third class corresponds to either the first class or the second class, the classification system may assign the class corresponding the third class as the assigned class. In other cases, the classification system may select the class having the highest confidence value as the assigned class. It should be understood that in some cases, the classification system may also generate additional classes and corresponding confidence values when determining the class in the manner discussed herein.

As an alternate example, the classification system may rely upon a difference between the confidence values when determining the class. For instance, the classification system may determine the third class and the third confidence value when the first class differs from the second class and the difference between the first confidence value and the second confidence value is less than a threshold difference.

Figure 10:
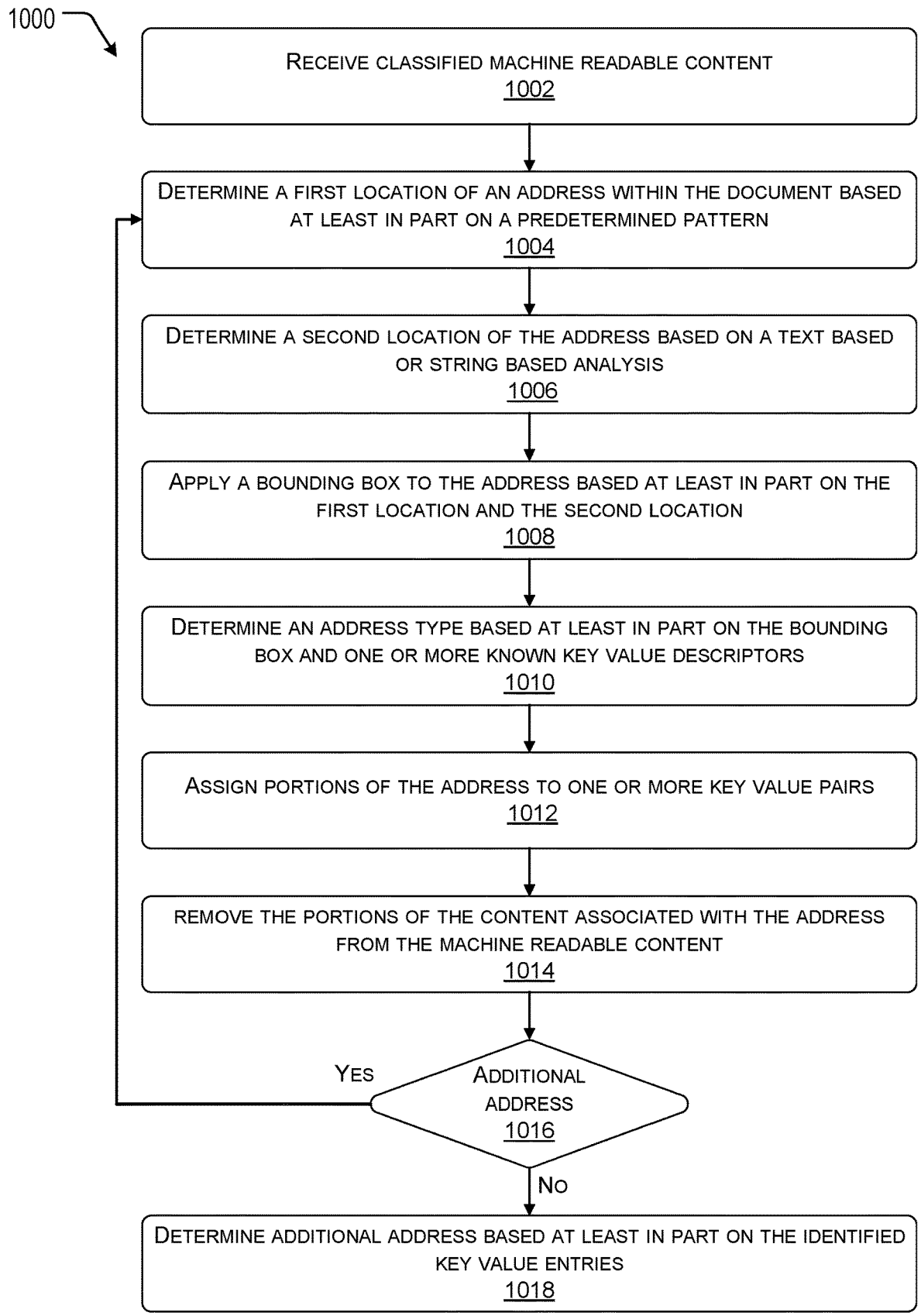
FIG. 10 is a flow diagram illustrating an example process associated with the data extraction system of FIG. 1 according to some implementations.

FIG. 10 is a flow diagram illustrating an example process 1000 associated with the data extraction system 112 of FIG. 1 according to some implementations. In this example, the process 1000 may be configured to extract data associated with one or more address, as discussed herein.

At 1002, the data extraction system may receive classified machine readable content. For example, the machine readable content may be generated from an optical character recognition system, as discussed above.

At 1004, the data extraction system may determine a first location of an address within the document based at least in part on a predetermined pattern. For example, the data extraction system may attempt to match one or more pattern associated with addresses with a portion of the machine readable content.

At 1006, the data extraction system may determine a second location of the address based on a text based or string based analysis. For example, the data extraction system may parse the content to identify words or strings that typically are associated with addresses. In some cases, the first location and the second location may be the same and/or overlapping.

At 1008, the data extraction system may apply a bounding box to the address based at least in part on the first location and the second location. For example, the data extraction system may parse adjacent content to determine whether or not the content is associated with the address.

At 1010, the data extraction system may determine an address type based at least in part on the bounding box and one or more known key value descriptors. For example, the data extraction system may utilize a dictionary including shipping descriptors (such as destination, ship to, port of origin, and the like) to identify a type of address that has been located.

At 1012, the data extraction system may assign portions of the address to one or more key value pairs and remove the portions from the machine readable content. In some cases, the data extraction system may assign portions of the address to specific fields associated with the address type (such as city, street name, street number, location codes, country codes, and the like).

At 1014, the data extraction system may remove the portions of the content associated with the address from the machine readable content. For example, once the portions are assigned to key value descriptors as key value entries, the data extraction system may remove the address content from the machine readable content.

At 1016, the data extraction system may determine if additional addresses may exist. For instance, the data extraction system may determine if each expected address has been located or if on the prior pass no additional address locations were identified. If there are additional addresses, the process 1000 may return to 1004 and attempt to locate an additional address location. Otherwise, the process 1000 may move to 1018.

At 1018, the data extraction system may determine additional addresses based at least in part on the identified key value entries. For example, the data extraction system may perform a final parsing or pass of the machine readable content to identify any missing addresses based on key value descriptors. For example, if a location of origin has not been located, the data extraction system may parse the machine readable content for an alias associated with location of origin.

Figure 11:
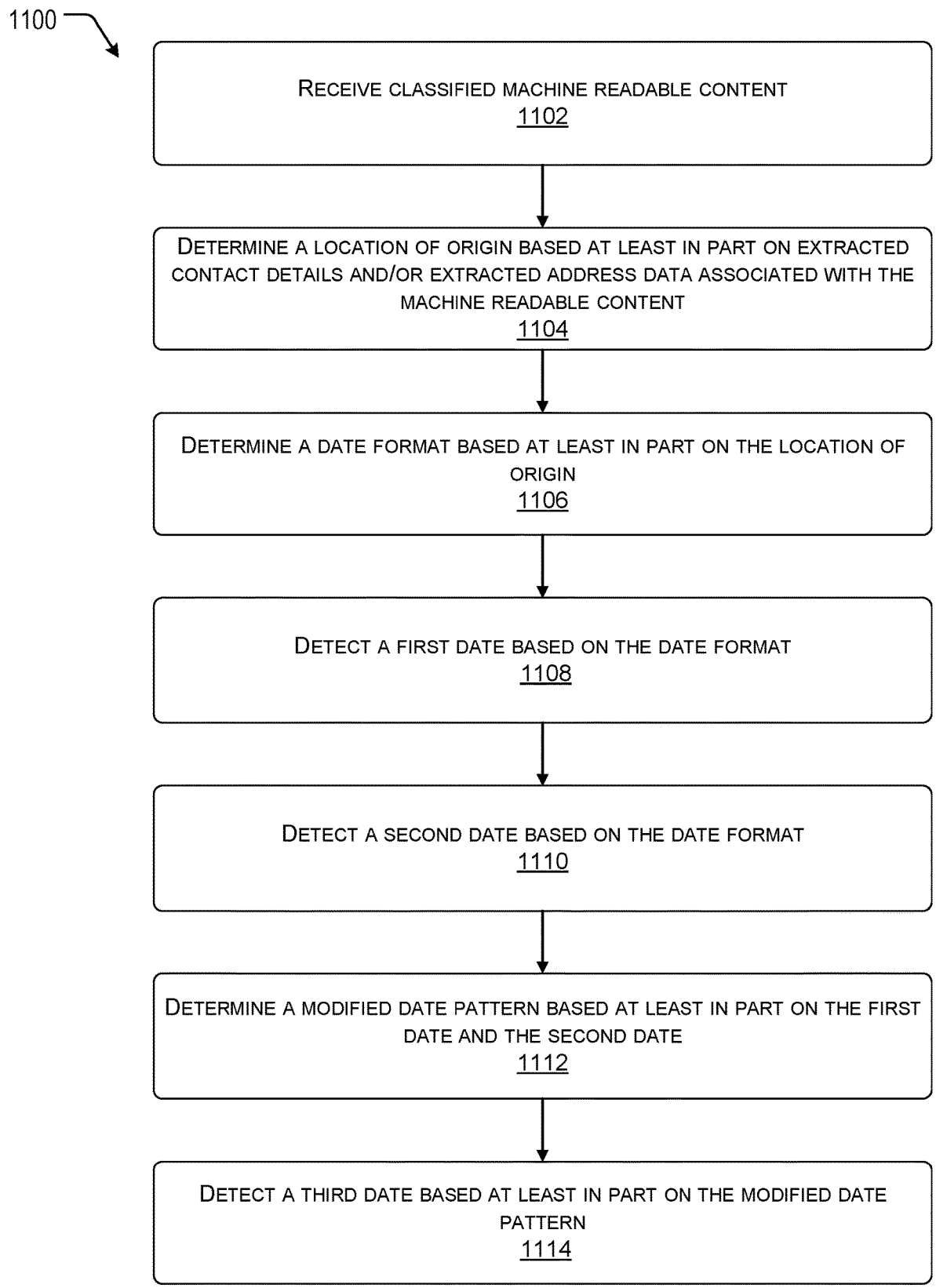
FIG. 11 is a flow diagram illustrating an example process associated with the data extraction system of FIG. 1 according to some implementations.

FIG. 11 is a flow diagram illustrating an example process 1100 associated with the data extraction system 112 of FIG. 1 according to some implementations. In some cases, the data extraction system may also be configured to extract data representing dates associated with the transporting of goods. As discussed above, dates may be particularly difficult data for extraction using conventional or traditional systems, as the dates may appear in many different formats and, in some cases, multiple formats within the same document.

At 1102, the data extraction system may receive classified machine readable content. For example, the machine readable content may be generated from an optical character recognition system, as discussed above.

At 1104, the data extraction system may determine a location of origin based at least in part on extracted contact details and/or extracted address data associated with the machine readable content. For example, as discussed above, the data extraction system may identify contact details associated with a seller or location of origin and/or an address associated with the location of origin.

At 1106, the data extraction system may determine a date format based at least in part on the location of origin. For example, the data extraction system may be configured with one or more date to jurisdiction or location dictionaries and/or datastore. The data extraction system may, in these cases, determine the date format using the dictionary. It should be understood, that in some situations multiple date formats may be identified.

At 1108, the data extraction system may detect a first date based on the date format. For example, the data extraction system may parse the machine readable content for a pattern that matches the pattern of the date format.

At 1110, the data extraction system may detect a second date based on the date format. For example, the data extraction system may continue to parse the machine readable content for the pattern that matches the pattern of the date format.

At 1112, the data extraction system may determine a modified date pattern based at least in part on the first date and the second date. For example, the pattern of the first date and/or the second date may vary from the date pattern stored with respect to the dictionary/data store and the location of origin.

At 1114, the data extraction system may detect a third date based at least in part on the modified date pattern. For example, the data extraction system may continue to parse the machine readable content for the modified date pattern that was generated based on the prior identified dates. In some cases, it should be understood, that upon detection of a date, the corresponding content may be removed or otherwise filtered from the machine readable content prior to a second pass or parsing by the data extraction system.

Figure 12:
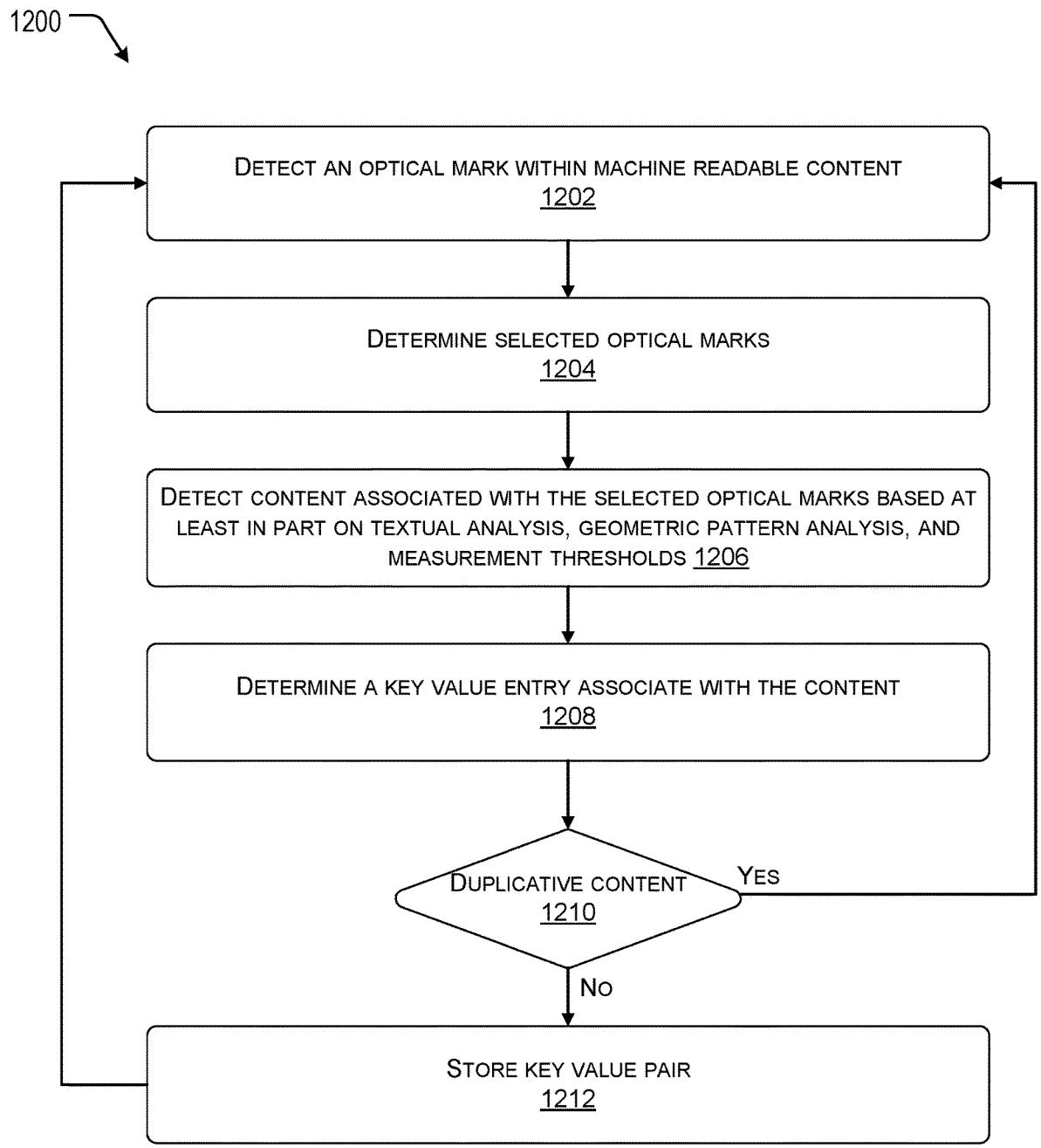
FIG. 12 is a flow diagram illustrating an example process associated with the data extraction system of FIG. 1 according to some implementations.

FIG. 12 is a flow diagram illustrating an example process 1200 associated with the data extraction system 112 of FIG. 1 according to some implementations. As discussed above, the data extraction system may be configured to extract data associated with selected optical marks, such as a series of selectable option on a form.

At 1202, the data extraction system may detect an optical mark within machine readable content. For example, the document may have multiple selectable options as part of a form or the like. In this case, the data extraction system may utilize pattern matching, machine learned models and/or networks, and the like to detect the presence of the selectable options and the content associated therewith. For instance, the content associated with the selectable options may be adjacent to but spaced away from the optical marks.

At 1204, the data extraction system may determine selected optical marks. For example, the data extraction system may utilize pattern matching, machine learned models and/or networks, and the like to detect which of the optical marks are selected and which are unselected.

At 1206, the data extraction system may detect content associated with the selected optical marks based at least in part on textual analysis, geometric pattern analysis, and measurement thresholds.

At 1208, the data extraction system may determine a key value entry associated with the content. For example, the data extraction system may determine portions of the content that may be utilized as a key value entry. For example, the data extraction system may include key value descriptors based on, for instance, the classification of the machine readable content and the data extraction system may determine if the content matches any of the key value descriptors.

At 1210, the data extraction system may determine if the content is duplicative. If the content is duplicative, the process 1200 may return to 1202. Otherwise, the process 1200 may proceed to 1212 and the data extraction system may store the key value pair.

Figure 13:
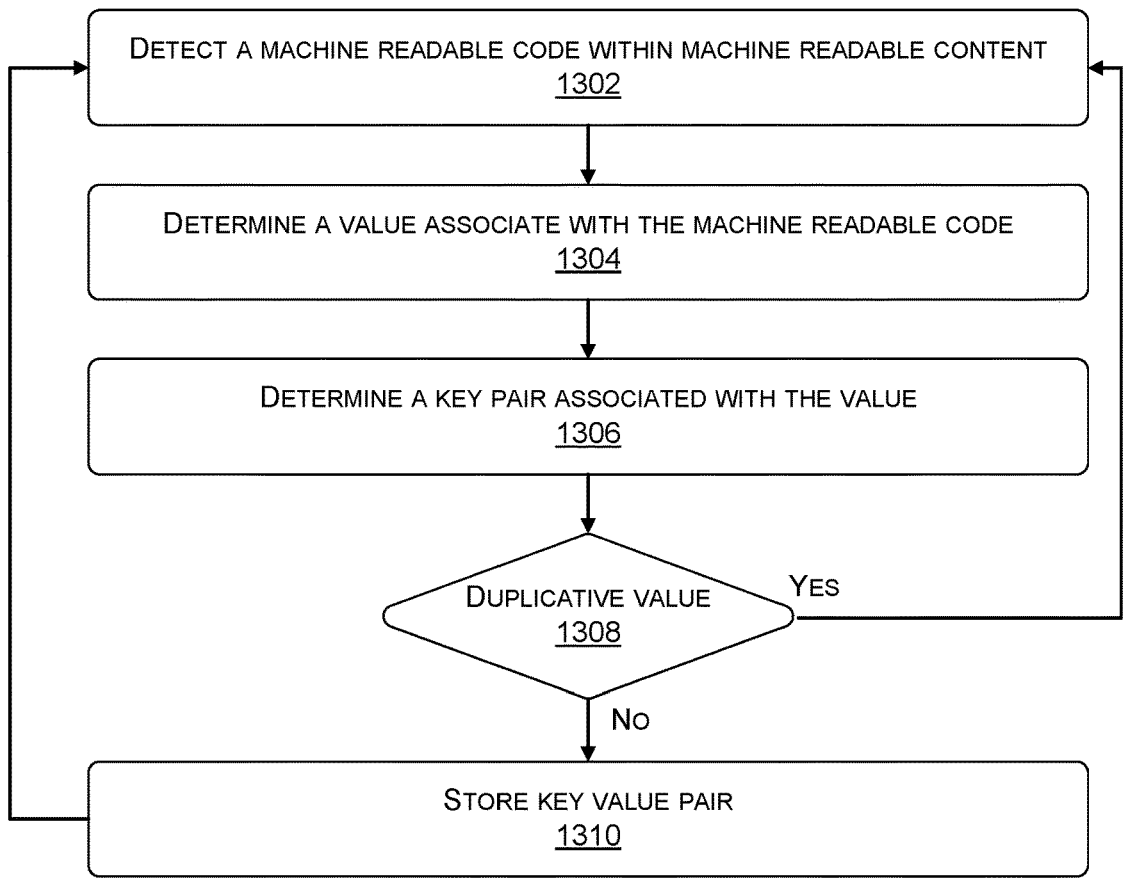
FIG. 13 is a flow diagram illustrating an example process associated with the data extraction system of FIG. 1 according to some implementations.

FIG. 13 is a flow diagram illustrating an example process 1300 associated with the data extraction system 112 of FIG. 1 according to some implementations. As discussed above, the data extraction system may be configured to extract data associated with selected machine readable codes or icons, such as a barcode and/or QR codes.

At 1302, the data extraction system may detect a machine readable code within machine readable content. For example, the document may have bar codes, QR codes, or other machine readable encodings. In this case, the data extraction system may utilize, pattern matching, machine learned models and/or networks, and the like to detect the presence of the machine readable code.

At 1304, the data extraction system may determine a value associated with the machine readable code. For example, the data extraction system may scan or otherwise read or access the data associated with the machine readable code. It should be understood that, in some cases, the data extraction system may access third-party systems in order to extract the data associated with the machine readable code.

At 1306, the data extraction system may determine a key value entry associate with the value. For example, the data extraction system may include key value descriptors based on, for instance, the classification of the machine readable content and the data extraction system may determine if the value matches any of the key value descriptors.

At 1308, the data extraction system may determine if the value is duplicative. If the value is duplicative, the process 1300 may return to 1302. Otherwise, the process 1300 may proceed to 1310 and the data extraction system may store the key value pair.

Figure 14:
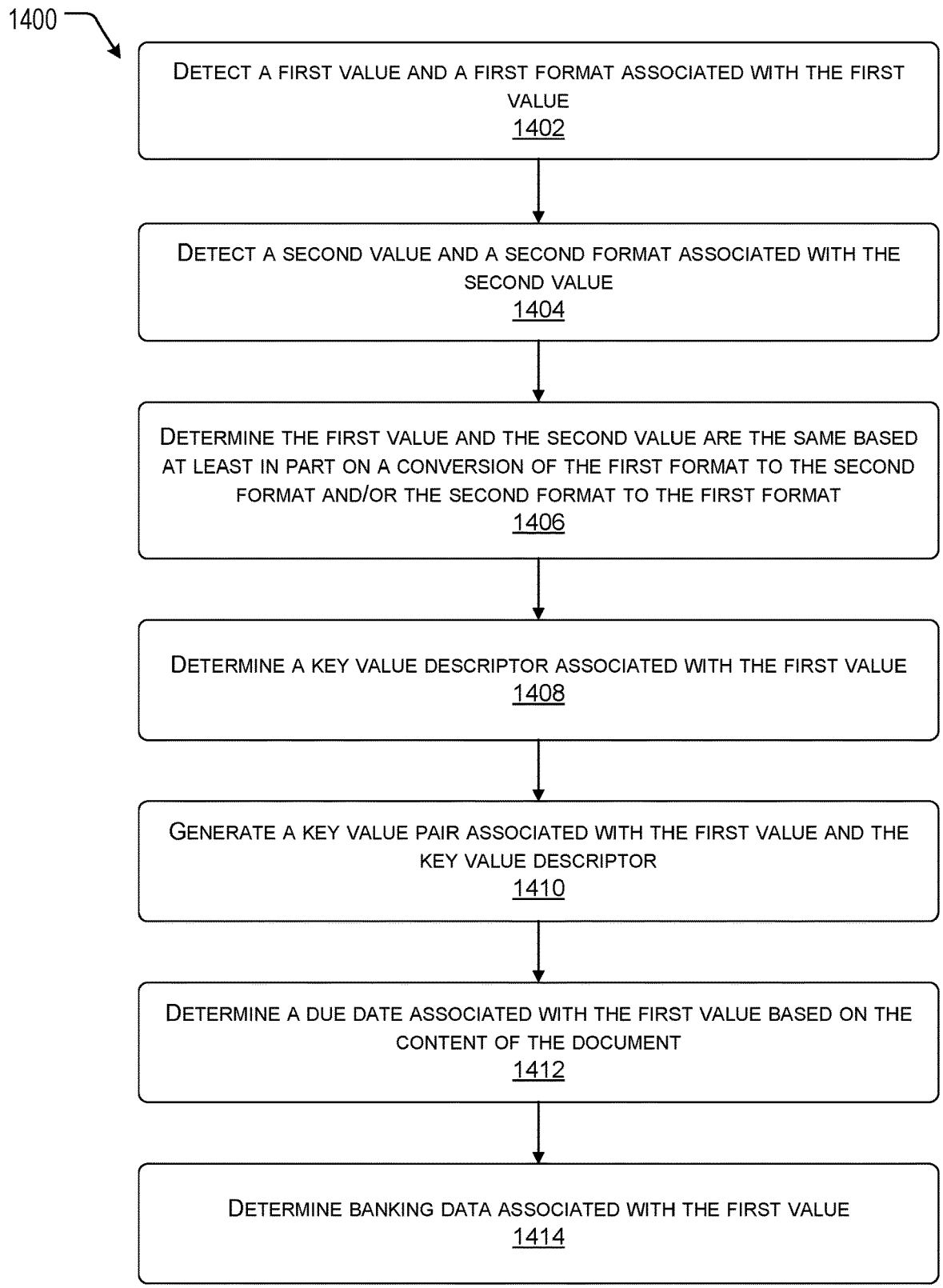
FIG. 14 is a flow diagram illustrating an example process associated with the data extraction system of FIG. 1 according to some implementations.

FIG. 14 is a flow diagram illustrating an example process 1400 associated with the data extraction system 112 of FIG. 1 according to some implementations. As discussed above, the system may also store extra data associated with designated key value descriptors. For instance, the key value descriptors may be selected based on a class or type of the document generated during segmentation and classification. In some cases, the key value entry may be duplicative, such as in two monetary denominations.

At 1402, the data extraction system may detect a first value and a first format associated with the first value. For example, the data may be a monetary value and the first format may be a first domination, such as a denomination of the jurisdiction of origin.

At 1404, the data extraction system may detect a second value and a second format associated with the second value. For example, the second value may also be a monetary value and the second format may be a second domination, such as a denomination of a receiving jurisdiction.

At 1406, the data extraction system may determine that the first value and the second value are the same based at least in part on a conversion of the first format to the second format and/or the second format to the first format. For example, the values may be converted to the same format and compared to see if the values match. In some case, conversion data may be accessed using a third-party datastore based on a date of contract, date of pick up, date of delivery, and the like.

At 1408, the data extraction system may determine a key value descriptor associated with the first value and/or the second value and, at 1410, the data extraction system may generate a key value pair assorted with the first value and the key value descriptor.

At 1412, the data extraction system may also determine a due date associated with the first value based on the content of the document. For example, the system may determine that the invoice was due thirty days from delivery and utilize the first value, a delivery date, and the thirty days to determine a due date. It should be understood, that in some cases, the document may include multiple due dates with various percentages and/or monetary values due at each of the multiple due dates. The due dates may also have varying triggers such as date of shipping, date of loading, date of contract, and the like.

At 1414, the data extraction system may determine banking data associated with the first value. For example, the data extraction system may identify a SWIFT code or other banking data associated with the seller and/or buyer of the goods. In these cases, the system may access third party systems, such as banking systems, to complete a banking transfer of the amount specified in the first value at the due date determined. In other cases, the system may send an alert to a third party system, such as a buyer system and/or seller system indicating that the amount is due or due within a threshold number of days.

Figure 15:
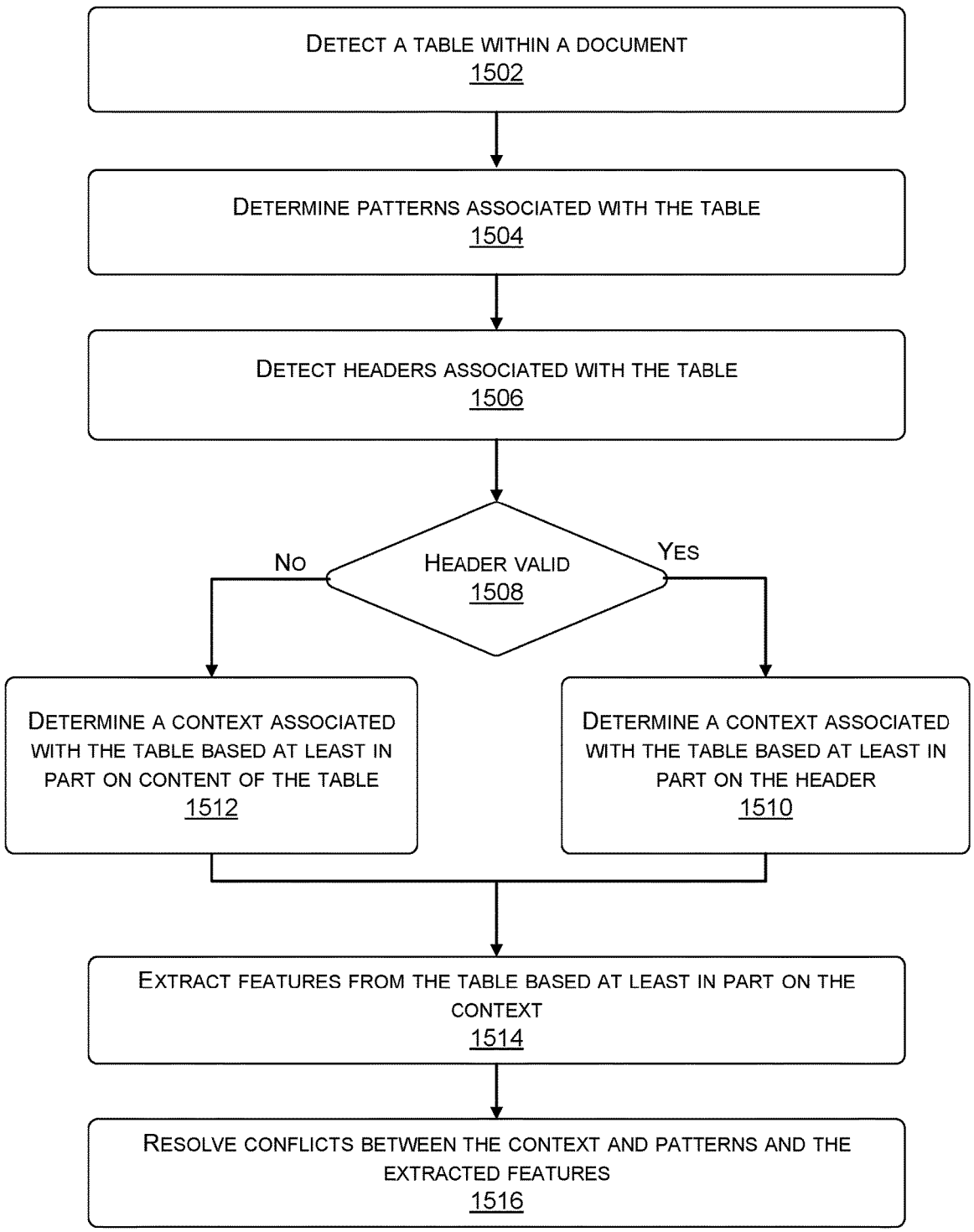
FIG. 15 is a flow diagram illustrating an example process associated with the data extraction system of FIG. 1 according to some implementations.

FIG. 15 is a flow diagram illustrating an example process 1500 associated with the data extraction system 112 of FIG. 1 according to some implementations. As discussed above, the data extraction system may be configured to extract data associated with bordered and borderless tables using multiple techniques. In some cases, the system may determine a context of each table when parsing and extraction features and/or data.

At 1502, the data extraction system may detect a table within a document or image of a document page, as discussed herein. In some cases, the table may be bordered and/or the table may be borderless. In some instances, the table may be detected using pattern matching and/or semantic content matching between a majority of the content of the document and the content being attributed to the table. It should be understood that other techniques of table detection may also be used such as using a machine learned model and/or network.

At 1504, the data extraction system may determine patterns associated with the table. For example, the data extraction system may determine a number of rows and/or columns, line spacing, column and row spacing, font size, and the like.

At 1506, the data extraction system may detect headers associated with the table. The data extraction system may also detect a termination and/or footer associated with the table.

At 1508, the data extraction system may determine if a valid header exists. For instance, in some cases, the table may not include a header, table title, or the like. If there is a header, the process 1500 may advance to 1510, and the system may determine a context associated with the table based at least in part on the header. Otherwise, the process 1500 may move to 1512, and the system may determine the content based at least in part on the content of the table.

At 1514, the data extraction system may extract features from the table based at least in part on the context. For example, the system may select key value descriptors based at least in part on the context and then parse the content of the table for the key value entries matching the selected descriptors. In some cases, the data extraction system may also utilize ISO procedures to determine the key value descriptors.

At 1516, the data extraction system may resolve conflicts between the context and patterns and the extracted features. For example, the data extraction system may determine conflicts generated based on multiple languages, multiple currencies, overwriting borders (e.g. content of an entry exceeds the borders of the table row/column pairs), and the like.

Figure 16:
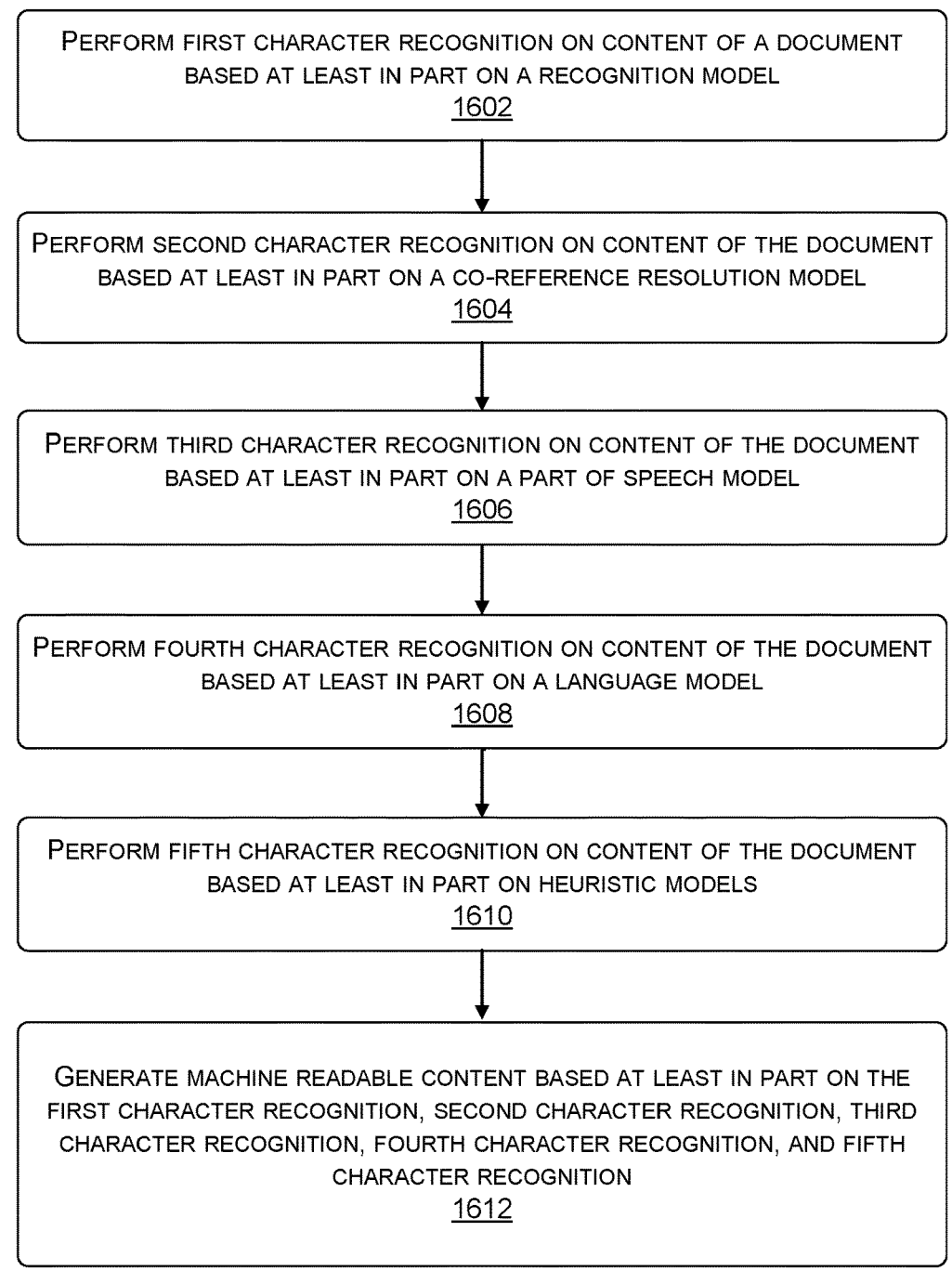
FIG. 16 is a flow diagram illustrating an example process associated with the optical character recognition system of FIG. 1 according to some implementations.

FIG. 16 is a flow diagram illustrating an example process 1600 associated with the optical character recognition system 108 of FIG. 1 according to some implementations. As discussed above, the system may be configured to convert each of the pages of the documents into an image, preprocess the image, and then covert the images to machine readable content via an OCR process.

At 1602, the optical character recognition system may perform first character recognition on content of a document based at least in part on a recognition model. In some cases, the recognition model may be configured to recognize characters, words, and/or phrases using one or more dictionaries. For example, the character recognition system may be more accurate when detecting letters and numbers in combination than a word or phrase based recognition system. As discussed above the optical character recognition system may utilize multiple optical character recognition techniques and utilize different techniques for different portions of the content. In this manner, the system may generate at least first machine readable content associated with the document.

At 1604, the optical character recognition system may perform second character recognition on content of the document based at least in part on a co-reference resolution model. For example, the system may generate second machine readable content associated with the document.

At 1606, the optical character recognition system may perform third character recognition on content of the document based at least in part on a part of speech model. For example, the system may utilize a part of speech model or dictionary to generate third machine readable content associated with the document.

At 1608, the optical character recognition system may perform fourth character recognition on content of the document based at least in part on a language model. For example, the system may generate fourth machine readable content associated with the document.

At 1610, the optical character recognition system may perform fifth character recognition on content of the document based at least in part on heuristic models and generate fifth machine readable content.

At 1612, the optical character recognition system may generate machine readable content based at least in part on the first character recognition, second character recognition, third character recognition, fourth character recognition, and fifth character recognition. For example, the optical character recognition system may generate machine readable content using portions of the first through fifth machine generated content based on the context of the content and correlations, correspondences, and/or matches between the multiple machine readable contents.

Figure 17:
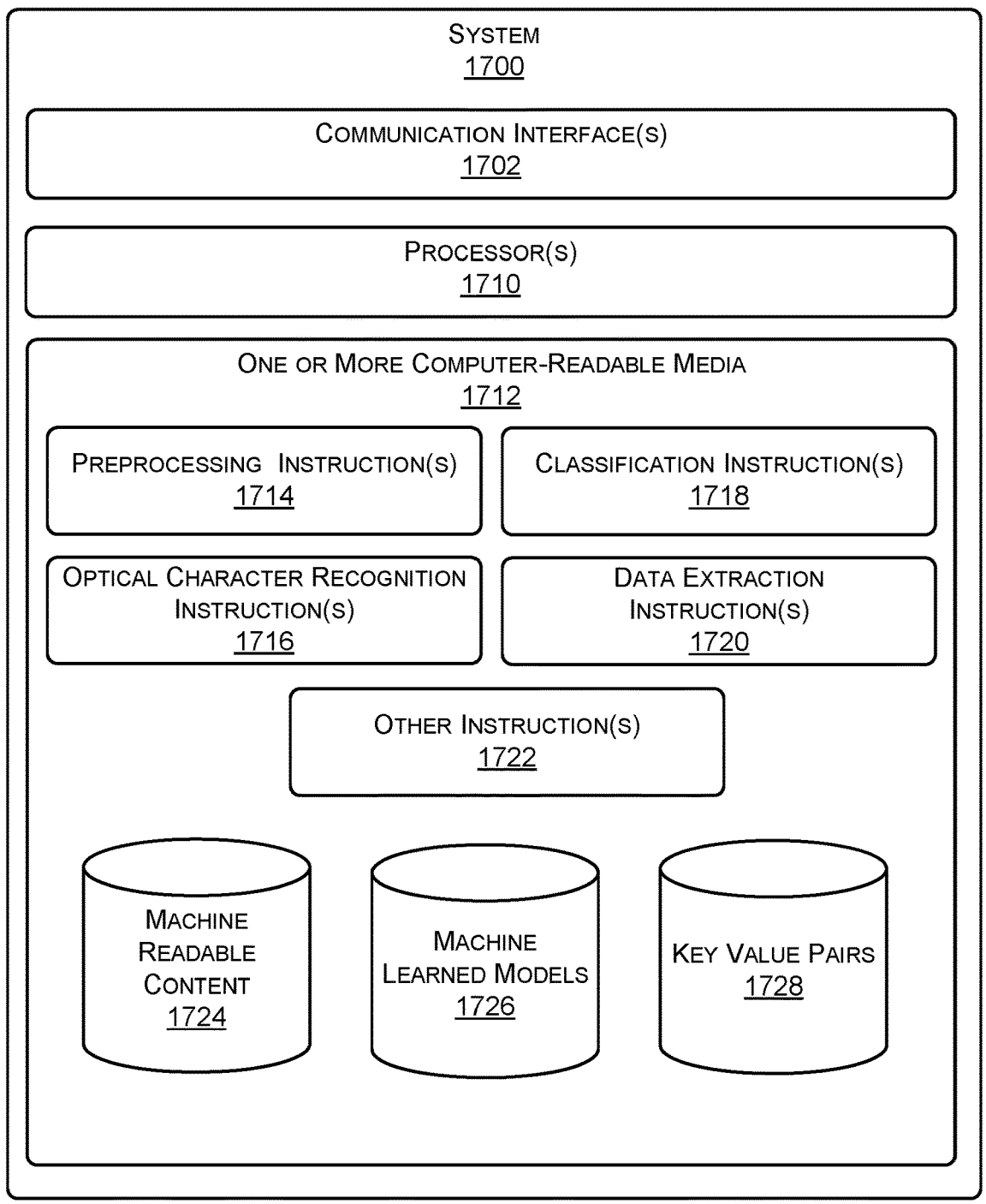
FIG. 17 is an example system that may implement the techniques described herein according to some implementations.

FIG. 17 is an example system 1700 that may implement the techniques described herein according to some implementations. The system 1700 may include one or more communication interface(s) 1702 (also referred to as communication devices and/or modems). The one or more communication interfaces(s) 1702 may enable communication between the system 1700 and one or more other local or remote computing device(s) or remote services, such as sensors system of FIG. 6. For instance, the communication interface(s) 1702 can facilitate communication with other proximity sensor systems, a central control system, or other facility systems. The communications interfaces(s) 1702 may enable Wi-Fi-based communication such as via frequencies defined by the IEEE 802.11 standards, short range wireless frequencies such as Bluetooth, cellular communication (e.g., 2G, 3G, 4G, 4G LTE, 6G, etc.), satellite communication, dedicated short-range communications (DSRC), or any suitable wired or wireless communications protocol that enables the respective computing device to interface with the other computing device(s).

The system 1700 may include one or more processor(s) 1710 and one or more computer-readable media 1712. Each of the processors 1710 may itself comprise one or more processors or processing cores. The computer-readable media 1712 is illustrated as including memory/storage. The computer-readable media 1712 may include volatile media (such as random access memory (RAM)) and/or nonvolatile media (such as read only memory (ROM), Flash memory, optical disks, magnetic disks, and so forth). The computer-readable media 1712 may include fixed media (e.g., GPU, NPU, RAM, ROM, a fixed hard drive, and so on) as well as removable media (e.g., Flash memory, a removable hard drive, an optical disc, and so forth). The computer-readable media 1712 may be configured in a variety of other ways as further described below.

Several modules such as instructions, data stores, and so forth may be stored within the computer-readable media 1712 and configured to execute on the processors 1710. For example, as illustrated, the computer-readable media 1712 stores preprocessing instructions 1714, optical character recognition instructions 1716, classification instructions 1718, data extraction instructions 1720 as well as other instructions 1722, such as an operating system. The preprocessing instructions 1714, optical character recognition instructions 1716, classification instructions 1718, data extraction instructions 1720 may operate as described above with respect to the preprocessing systems, optical character recognition systems, classification systems, and/or data extraction systems. The computer-readable media 1710 may also be configured to store data, such as machine readable content 1724 and machine learned models 1726, and key value pairs 1728 as well as other data.

While the example clauses described above are described with respect to one particular implementation, it should be understood that, in the context of this document, the content of the example clauses can also be implemented via a method, device, system, a computer-readable medium, and/or another implementation. Additionally, any of examples may be implemented alone or in combination with any other one or more of the other examples.

What is claimed:

1. A method comprising:
   receiving an image of a document;
   preprocessing the image to align individual pages of the document with an upright vectors;
   generating first machine readable content based at least in part on a first optical character recognition system, the first machine readable content representing the document;
   generating second machine readable content based at least in part on a second optical character recognition system, the second machine readable content representing the document;
   generating third machine readable content based at least in part on the first machine readable content and the second machine readable content;
   generating a first classification for the document based at least in part on the third machine readable content and a first classification system;
   generating a second classification for the document based at least in part on the third machine readable content and a second classification system;
   generating an assigned classification for the document based at least in part on the first classification and the second classification;
   generating extracted data from the third machine readable content, the extracted data associated with one or more key value descriptors assigned based at least in part on the assigned classification;
   generating fourth machine readable content by removing content associated with the extracted data from the third machine readable content; and
   generating additional extracted data from the fourth machine readable content, the additional extracted data associated with the one or more of the key value descriptors assigned.

2. The method of claim 1, further comprising segmenting the image of the document into multiple images, individual images associate with a portion of the document; and
   wherein the first classification system differs from the second classification system and the first classification is based at least in part on at least one of:
   a machine learned model;
   a dictionary; or
   a heuristics model.

3. The method of claim 1, wherein preprocessing the image further comprises:
   identifying an imperfection within the image;
   determining a first bounding box associated with the imperfection;
   determining a second bounding box associated with content of the document;
   preforming at least one first operation on the first bounding box to reduce a visibility of the imperfection; and
   preforming at least one second operation on the second bounding box to increase a visibility of the content.

4. The method of claim 1, wherein the first classification system generates a first confidence value associated with the first classification and the second classification system generates a second confidence value associated with the second classification.

5. The method of claim 4, wherein:
   the first classification differs from the second classification;
   a difference in the first confidence value and the second confidence value is less than or equal to a threshold;
   the method further comprises:
   generating, responsive to the difference being less than or equal to the threshold, a third classification and third confidence value for the document based at least in part on the third machine readable content and a third classification system; and
   generating the assigned classification is based at least in part on the third classification and the third confidence value.

6. The method of claim 1, wherein the extracted data includes a first date and the generating the extracted data comprises:
   determining a date format based at least in part on one or more of a language associated with the third machine readable content, a location of origin of assets associated with the document, or a destination location for the assets; and
   detecting the first date within the machine readable content based at least in part on the date format.

7. The method of claim 6, further comprising:
   detecting a second date within the machine readable content based at least in part on the date format;
   determining a modified date format based at least in part on the first date and the second date; and
   detecting a third date within the machine readable content based at least in part on the modified date format.

8. The method of claim 1, wherein the extracted data includes an address and the generating the extracted data comprises:
   determining an address pattern based at least in part on one or more of a language associated with the third machine readable content, a location of origin of assets associated with the document, or a destination location for the assets;
   determining a location associated with the address based at least in part on the address pattern;

generating an address bounding box associated with the address; and determining an address type based at least in part on content of the third machine readable content adjacent to the bounding box.

9. The method of claim 1, wherein the extracted data includes an optical mark and the generating the extracted data comprises:
   detecting the optical mark within the machine readable content;
   determining the optical mark is selected;
   detecting content within the third machine readable content that is associated with the optical mark based at least in part on one or more of a textual analysis, a geometric pattern analysis, or a measurement thresholds; and
   extracting the content as the extracted data.

10. The method of claim 1, wherein the extracted data includes a virtual table and the generating the virtual table comprises:
    determine a content pattern based at least in part on the third machine readable content;
    detecting a table within the third machine readable content based at least in part on a change between the content pattern and a pattern associated with content of the third machine readable content representing the table;
    determining a context of the table; and
    extraction features from the content of the third machine readable content representing the table, the extracted features organized as the virtual table.

11. A system comprising:
    one or more processors; and
    one or more non-transitory computer-readable media storing instructions that, when executed by the one or more processors, cause the one or more processors to perform operations comprising:
        receiving an image of a document, the document associated with an asset;
        generating first machine readable content based at least in part on a first optical character recognition system, the first machine readable content representing the document;
        generating second machine readable content based at least in part on a second optical character recognition system, the second machine readable content representing the document;
        generating third machine readable content based at least in part on the first machine readable content and the second machine readable content;
        generating a first classification for the document based at least in part on the third machine readable content and a first classification system;
        generating a second classification for the document based at least in part on the third machine readable content and a second classification system;
        generating a first confidence value associated with the first classification;
        generating a second confidence value associated with the second classification;
        determining a difference in the first confidence value and the second confidence
        generating, responsive to the difference in the first confidence value and the second confidence being less than or equal to a threshold, a third classification and third confidence value for the document based at least in part on the third machine readable content and a third classification system;
        generating an assigned classification for the document based at least in part on the first classification, the second classification, the third confidence classification, and the third confidence value; and
        generating extracted data from the third machine readable content, the extracted data associated with one or more key value descriptors assigned based at least in part on the assigned classification.

12. The system as recited in claim 11, further comprising preprocessing the image prior to generating the first machine readable content and the second machine readable content.

13. One or more non-transitory computer-readable media storing instructions that, when executed by one or more processors, cause the one or more processors to perform operations comprising:
    receiving an image of a document, the document associated with a transport of an asset;
    preprocessing the image to align individual pages of the document with an upright vectors, the preprocessing further comprising;
        identifying an imperfection within the image;
        determining a first bounding box associated with the imperfection;
        determining a second bounding box associated with content of the document;
        preforming at least one first operation on the first bounding box to reduce a visibility of the imperfection; and
        preforming at least one second operation on the second bounding box to increase a visibility of the content;
    generating first machine readable content based at least in part on a first optical character recognition system, the first machine readable content representing the document;
    generating second machine readable content based at least in part on a second optical character recognition system, the second machine readable content representing the document;
    generating third machine readable content based at least in part on the first machine readable content and the second machine readable content;
    generating a first classification for the document based at least in part on the third machine readable content and a first classification system;
    generating a second classification for the document based at least in part on the third machine readable content and a second classification system;
    generating an assigned classification for the document based at least in part on the first classification and the second classification; and
    generating extracted data from the third machine readable content, the extracted data associated with one or more key value descriptors assigned based at least in part on the assigned classification.

14. The one or more non-transitory computer-readable media of claim 13, further comprising segmenting the image of the document into multiple images, individual images associate with a portion of the document; and
    wherein the first classification system differs from the second classification system and the first classification is based at least in part on at least one of:
    a machine learned model;
    a dictionary; or
    a heuristics model.

15. The one or more non-transitory computer-readable media of claim 13, wherein the extracted data includes a first date and the generating the extracted data comprises:
- determining a date format based at least in part on one or more of a language associated with the third machine readable content, a location of origin of the assets, or a destination location for the assets;
- detecting the first date within the machine readable content based at least in part on the date format;
- detecting a second date within the machine readable content based at least in part on the date format;
- determining a modified date format based at least in part on the first date and the second date; and
- detecting a third date within the machine readable content based at least in part on the modified date format.

16. The one or more non-transitory computer-readable media of claim 13, wherein the extracted data includes an address and the generating the extracted data comprises:
- determining an address pattern based at least in part on one or more of a language associated with the third machine readable content, a location of origin of the assets, or a destination location for the assets;
- determining a location associated with the address based at least in part on the address pattern;
- generating an address bounding box associated with the address; and
- determining an address type based at least in part on content of the third machine readable content adjacent to the bounding box.

17. The one or more non-transitory computer-readable media of claim 13, wherein the extracted data includes an optical mark and the generating the extracted data comprises:
- detecting the optical mark within the machine readable content;
- determining the optical mark is selected;
- detecting content within the third machine readable content that is associated with the optical mark based at least in part on one or more of a textual analysis, a geometric pattern analysis, or a measurement thresholds; and
- extracting the content as the extracted data.

18. The method of claim 1, further comprising:
- determining a language associated with the document based at least in part on the extracted data and one or more language dictionaries;
- assigning, based at least in part on the language, at least one aliases term to at least one word or phrase of the extracted data.

19. The system as recited in claim 11, wherein the operations further comprises:
- determining a first language associated with a first portion of the document based at least in part on the extracted data and one or more language dictionaries;
- determining a second language associated with a second portion of the document based at least in part on the extracted data and one or more language dictionaries;
- determining that the second portion is duplicative of the first portion; and
- filtering the second portion of the document from the extracted data.

20. The one or more non-transitory computer-readable media of claim 13, wherein the operations further comprises:
- determining a language associated with the document based at least in part on the extracted data and one or more language dictionaries.

* * * * *